US008680713B2

(12) United States Patent
Koshizuka et al.

(10) Patent No.: US 8,680,713 B2

(45) Date of Patent: Mar. 25, 2014

(54) OVER-VOLTAGE SUPPRESSION APPARATUS

(75) Inventors: Tadashi Koshizuka, Saitama-ken (JP); Minoru Saito, Kanagawa-ken (JP); Hiroshi Kusuyama, Kanagawa-ken (JP); Hiroyuki Maehara, Tokyo (JP); Yoshimasa Sato, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 460 days.

(21) Appl. No.: 13/125,913

(22) PCT Filed: Mar. 1, 2010

(86) PCT No.: PCT/JP2010/001371

§ 371 (c)(1),
(2), (4) Date: Apr. 25, 2011

(87) PCT Pub. No.: WO2010/103741

PCT Pub. Date: Sep. 16, 2010

(65) Prior Publication Data

US 2011/0204727 A1 Aug. 25, 2011

(30) Foreign Application Priority Data

Mar. 13, 2009 (JP) ................................ 2009-060925

(51) Int. Cl.
*H02J 3/00* (2006.01)

(52) U.S. Cl.
USPC ........................................................... 307/59

(58) Field of Classification Search
USPC ........................................................... 307/59
See application file for complete search history.

(56) References Cited

U.S. PATENT DOCUMENTS

| | | | |
|---|---|---|---|
| 2010/0110600 | A1 | 5/2010 | Saito et al. |
| 2010/0141050 | A1 | 6/2010 | Saito et al. |
| 2010/0200383 | A1 | 8/2010 | Saito |

FOREIGN PATENT DOCUMENTS

| | | |
|---|---|---|
| WO | 2000 04564 | 1/2000 |
| WO | 2008 065757 | 6/2008 |

OTHER PUBLICATIONS

International Search Report issued Apr. 13, 2010 in PCT/JP10/001371 filed Mar. 1, 2010.

*Primary Examiner* — Robert L. Deberadinis
(74) *Attorney, Agent, or Firm* — Oblon, Spivak, McClelland, Maier & Neustadt, L.L.P.

(57) ABSTRACT

An overvoltage suppression device which suppresses overvoltage that occurs when breakers which turn on/off the connection between a power source bus and a power transmission line, are turned on after the breakers are turned off. The overvoltage suppression device measures the waveform of voltage on the side of the power source and the voltage on the side of the power transmission line, and extracts the waveform of a component in a predetermined frequency band on the basis of the waveform obtained by multiplying the wave shape of the voltage on the side of the power source by the waveform of the voltage on the side of the power transmission line. The breakers are turned on on the basis of a cycle wherein the waveform is peaked.

16 Claims, 15 Drawing Sheets

OVER-VOLTAGE SUPPRESSION APPARATUS

CROSS-REFERENCE TO RELATED APPLICATION

This application claims benefit of priority from Japanese application number JP 2009-60925 filed Mar. 13, 2009, the entire contents of which are incorporated by reference herein.

BACKGROUND OF THE INVENTION

1. Field of the Invention

The present invention relates to an over-voltage suppression apparatus that suppresses over-voltage generated when a circuit breaker is re-closed.

2. Description of the Related Art

In general, on a no-load transmission line in which no compensation by a reactor is applied, there is a residual DC voltage on the transmission line after the circuit breaker interrupts the current. As is known, if the circuit breaker is re-closed in a condition in which this DC voltage is still present, an over-voltage (connection surge) is generated. The magnitude of this over-voltage is several times the system voltage. There is a risk that generation of such a large over-voltage may affect the insulation of equipment installed in the system.

A known method of suppressing such over-voltage when re-closing of a no-load transmission line is effected is the provision of a circuit breaker fitted with a resistor. For example in the case of a 500 kV system as used in Japan, a circuit breaker of the type that introduces a resistance into the circuit is employed in order to suppress such over-voltage. A circuit breaker fitted with a resistor has a construction in which the resistor that is introduced is connected in series with the contact. In a circuit breaker fitted with a resistor, connection is effected in parallel with the main contacts of the circuit breaker. A circuit breaker fitted with a resistor is re-closed before reclosing the main contacts of the circuit breaker. In this way, over-voltage is suppressed. An example is described in "Practical and Theoretical Handbook of Power System Technology" by Yoshihide Hase (hereinafter referred to as Non-patent Reference 1).

In contrast, in the case of a no-load transmission line that is compensated by a reactor, after current interruption is effected by the circuit breaker, an oscillating voltage is generated on the transmission line by the electrostatic capacitance thereof and the reactor. Even in this case, over-voltage is generated if the circuit breaker is re-closed at a time-point where the voltage between the circuit breaker contacts is large. In order to suppress over-voltage when re-closing a transmission line that is compensated by a reactor, a known method is to control the phase (timing) at which the circuit breaker is closed. This method consists in performing re-closing of the circuit breaker at a time-point where the voltage between contacts is small. The following are known methods of predicting the time-point at which the voltage between contacts is small.

As a first method, a method in which the voltage between contacts of the circuit breaker is approximated by a function, and the circuit breaker is closed with optimum timing is disclosed as follows. Let us first assume that the power source (side) voltage is a sine-wave of mains frequency. Also, if the oscillation voltage on the line side is of a single frequency, it can be regarded as a sine-wave. The voltage between contacts is predicted by approximating these two voltages by a sine-wave function. The closure timing of the circuit breaker is determined using this voltage between contacts. An example is to be found in Laid-open Japanese Patent Publication Tokkai 2003-168335 (hereinafter referred to as Patent Reference 1).

As the second method, a method in which the time between zero-points of voltage between contacts of the circuit breaker is measured and, using this information, the circuit breaker is closed at a future zero-point voltage between contacts of the circuit breaker is disclosed as follows. In this method, the time between the voltage zero points of a single cycle of the voltage between contacts after circuit breaking and the time between voltage zero points of the next single cycle of the voltage between contacts are measured. If these two times between the zero points of the voltage between contacts are the same, the frequency of the voltage between contacts is known. In this way, the future zero-point of the voltage between contacts can be deduced irrespective of the voltage waveform. An example is to be found in K. Froehlich: "Controlled Closing on Shunt Reactor Compensated Transmission Lines Part I: Closing Control Device Development", IEEE Transactions on Power Delivery, The Institute of Electrical and Electronics Engineers, Inc., April 1997, Vol. 12, No. 2, p 734-740 (hereinafter referred to as Non-patent Reference 2).

However, there are the following respective problems with the methods of over-voltage suppression described above.

If the method of over-voltage suppression using a circuit breaker fitted with a resistor is employed, a circuit breaker fitted with a resistor must be specially added to an ordinary circuit breaker. Consequently, in terms of the circuit breaker as a whole, the circuit breaker size is increased.

In some cases, a reactor is installed on the transmission line in order to compensate reactive power. When the transmission line on which the reactor is installed is open-circuited by the circuit breaker, voltage oscillations of the frequency determined by the electrostatic capacity of the transmission line and the inductance of the reactor are generated on the transmission line. In general, the frequency of the voltage oscillations of the transmission line is different from the frequency of the power source voltage. In this case, the voltage between contacts of the circuit breaker has a multifrequency wave (or multiple frequency wave).

In determining the optimum closure timing for a circuit breaker by approximating the voltage between contacts of the circuit breaker by a function, there are the following problems.

The electrostatic capacity of a transmission line, which determines the frequency of voltage oscillations of the line, comprises an in-phase capacitative component with respect to ground, an inter-phase component between the phase in question and other phases, and a component of the other phases with respect to ground. These electrostatic capacitances have different values in each phase, depending on the geometrical arrangement of the transmission line. Consequently, it is extremely rare for the oscillation waveform of the line voltage to be a single-frequency sine wave. Frequently, this oscillation waveform is itself already a multifrequency waveform. In this case, it is in itself difficult to approximate the voltage oscillations of the line by a function. Accordingly, it is extremely difficult in practice to find the voltage between contacts from a function approximation.

Furthermore, the following problems are experienced if the timing for circuit breaker closure is obtained by measuring the time between the voltage between contacts between zero points of the circuit breaker.

If the circuit breaker is closed in a condition with voltage applied between the circuit breaker poles, a discharge will be generated between the contacts if the voltage between the contacts exceeds the voltage-withstanding capability (dielectric strength) of the insulation between the contacts. If such a discharge is generated, the circuit breaker is brought into an electrically contacting condition before mechanical contact of the contacts takes place. Such a discharge is termed “pre-arcing”.

Now if the voltage between contacts of the circuit breaker is a multifrequency waveform, this voltage may have a peak value (crest value) greater than the power source voltage. In such cases, it can happen that a closed condition is produced by discharge produced by pre-arcing as described above at a time-point where the voltage between contacts is large, even though the circuit breaker attempted to close at a zero-point of the voltage between contacts.

In such cases, a large over-voltage can be generated. Consequently, when the voltage between contacts is of multifrequency waveform, over-voltage cannot be suppressed purely by measuring the voltage between contacts zero-points.

SUMMARY OF THE INVENTION

An object of the present invention, when the voltage between contacts of a circuit breaker is of multifrequency waveform, to provide an over-voltage suppression apparatus capable of suppressing over-voltage generated when the circuit breaker is closed.

In order to achieve the above object, an over-voltage suppression apparatus in accordance with the present invention is constructed as follows. Specifically, an over-voltage suppression apparatus that suppresses over-voltage generated when, after a circuit breaker that opens and closes the connection between a power system comprising a power source and a transmission line is opened, aforementioned circuit breaker is closed, comprises:

power source-side voltage measurement means that measures the waveform of the power source-side voltage, which is the voltage with respect to ground on aforementioned power system side of aforementioned circuit breaker;

transmission line side voltage measurement means that measures the waveform of the transmission line side voltage, which is the voltage with respect to ground on aforementioned transmission line side of aforementioned circuit breaker;

multiplication means that calculates a waveform by multiplying the waveform of aforementioned power source side voltage measured by aforementioned power source side voltage measurement means with the waveform of aforementioned transmission line side voltage measured by aforementioned transmission line side voltage measurement means;

extraction means that extracts the waveform of a component of a higher frequency band than the frequency of the DC component but lower than the frequency of aforementioned power source from aforementioned waveform calculated by aforementioned multiplication means;

period detection means that detects the period with which aforementioned waveform extracted by aforementioned extraction means is a maximum; and closure means that closes aforementioned circuit breaker in accordance with aforementioned period detected by aforementioned period detection means.

With the present invention, an over-voltage suppression apparatus can be provided that makes it possible to suppress over-voltage generated when a circuit breaker is closed, even when the voltage between contacts of the circuit breaker is of multifrequency waveform.

DETAILED DESCRIPTION OF THE PREFERRED EMBODIMENTS

Embodiments of the present invention are described below with reference to the drawings.

(First Embodiment)

Figure 1:
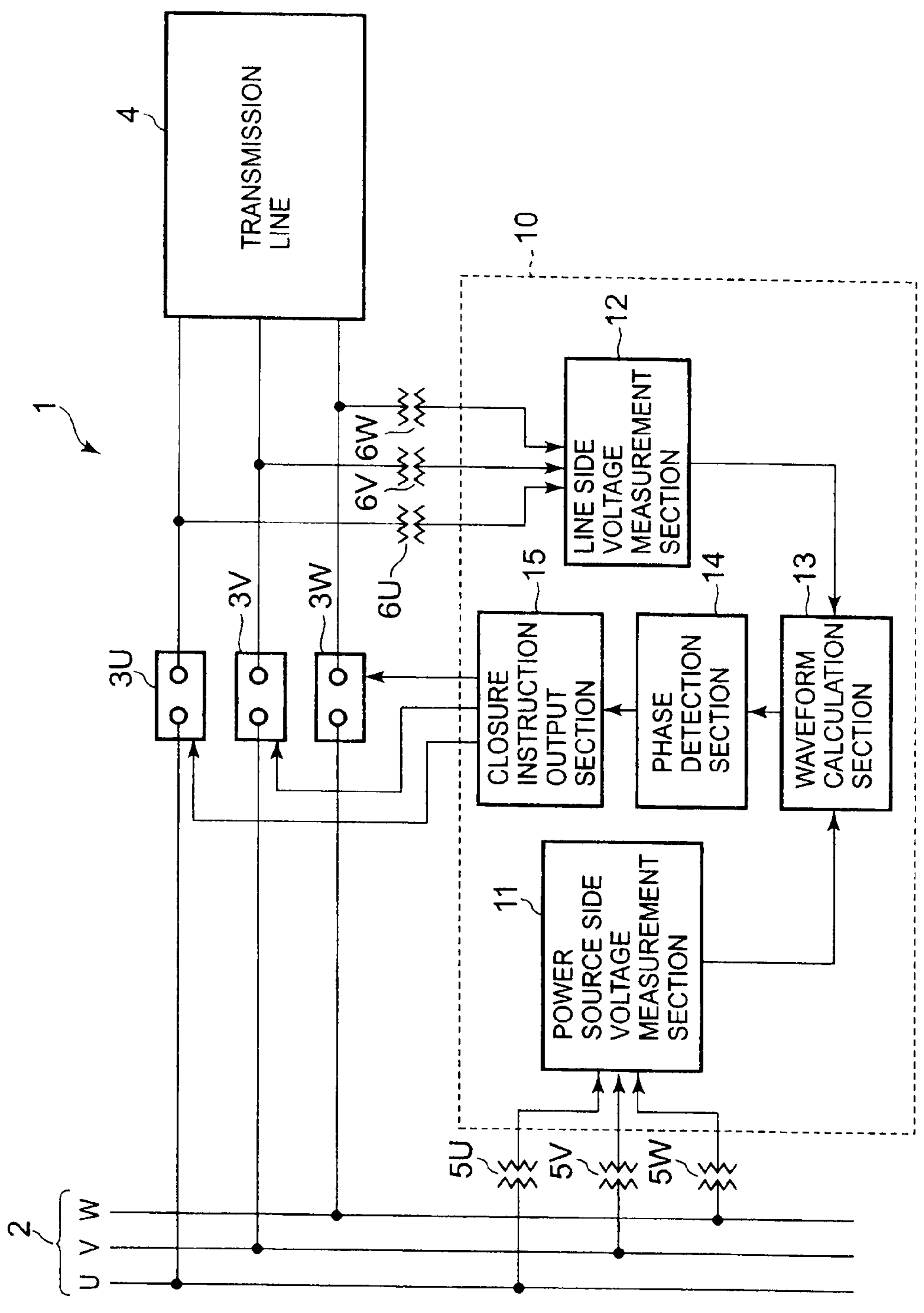
FIG. 1 is a layout diagram showing the layout of a power system to which an over-voltage suppression apparatus according to a first embodiment of the present invention has been applied.

FIG. 1 is a layout diagram showing the layout of a power system 1 to which an over-voltage suppression apparatus 10 according to a first embodiment of the present invention has been applied. It should be noted that corresponding portions in the following Figures are given the same reference numerals and further detailed description is dispensed with i.e. the description will focus on the differences between such portions. Repeated description will be avoided in the same way in the following embodiments.

A power system 1 comprises: a power source bus 2, three-phase circuit breakers 3U, 3V and 3W; a transmission line 4; three-phase power source side voltage detectors 5U, 5V and 5W, three-phase line side voltage detectors 6U, 6V and 6W, and an over-voltage suppression apparatus 10.

The power source bus 2 is a bus of the power source system comprising a three-phase AC power source comprising a U phase, V phase and W phase.

The transmission line 4 is electrically connected with the power source bus 2 through circuit breakers 3U, 3V and 3W. Although not shown, reactors are arranged between each phase of the transmission line 4 and ground. These reactors may be arranged at both ends of the transmission line 4, or may be arranged at one end only, for example.

The circuit breakers 3U, 3V and 3W respectively connect each phase of the transmission line 4 and the power source bus 2. The circuit breakers 3U, 3V and 3W are circuit breakers of the type in which each phase can be independently operated. The circuit breakers 3U, 3V and 3W are respectively provided for the U phase, V phase and W phase.

Power source side voltage detectors 5U, 5V and 5W are provided for respectively corresponding phases of the power source bus 2. The power source side voltage detectors 5U, 5V and 5W may be for example metering transformers. The power source side voltage detectors 5U, 5V and 5W detect the respective corresponding phase voltages (voltages with respect to ground or voltages to ground) of the power source bus 2. In other words, the power source side voltage detectors 5U, 5V and 5W detect the power source side voltages of the respectively corresponding circuit breakers 3U, 3V and 3W. The power source side voltage detectors 5U, 5V and 5W output the respectively detected phase voltages of the power source bus 2 to the over-voltage suppression apparatus 10.

The line side voltage detectors 6U, 6V and 6W are provided on the respectively corresponding phases of the transmission line 4. The line side voltage detectors 6U, 6V and 6W may be for example metering transformers. The line side voltage detectors 6U, 6V and 6W detect the respective corresponding phase voltages (voltages with respect to ground or voltages to ground) of the transmission line 4. In other words, the line side voltage detectors 6U, 6V and 6W detect the line side voltages of the circuit breakers 3U, 3V and 3W of the respectively corresponding phases. The line side voltage detectors 6U, 6V and 6W output the respectively detected phase voltages of the transmission line 4 to the over-voltage suppression apparatus 10.

The over-voltage suppression apparatus 10 inputs the phase voltages of the transmission line 4 detected by the line side voltage detectors 6U, 6V and 6W and the phase voltages of the power source bus 2 detected by the power source side voltage detectors 5U, 5V and 5W. If the circuit breakers 3U, 3V and 3W are opened, the over-voltage suppression apparatus 10 closes the circuit breakers 3U, 3V and 3W in accordance with the phase voltages of the power source bus 2 and the phase voltages of the transmission line 4.

The over-voltage suppression apparatus 10 comprises a power source side voltage measurement section 11, a line side voltage measurement section 12, a waveform calculation section 13, a phase detection section 14 and a closure instruction output section 15.

The power source side voltage measurement section 11 measures the voltage on the power source side of the circuit breakers 3U, 3V and 3W detected by the power source side voltage detectors 5U, 5V and 5W. The power source side voltage measurement section 11 outputs to the waveform calculation section 13 the measured power source side voltage waveform data of the circuit breakers 3U, 3V and 3W.

The line side voltage measurement section 12 measures the transmission line 4 voltages detected by the line side voltage detectors 6U, 6V and 6W. The line side voltage measurement section 12 outputs to the waveform calculation section 13 the measured voltage waveform data of the transmission line 4.

The waveform calculation section 13 performs waveform calculation processing for detecting the phase (timing) of closure of the circuit breakers 3U, 3V and 3W with respect to the voltage waveform data of the transmission line 4 measured by the line side voltage measurement section 12, and the voltage waveform data of the power source bus 2 measured by the power source side voltage measurement section 11. The waveform calculation section 13 outputs to the phase detection section 14 the voltage waveform data produced by waveform calculation processing.

The phase detection section 14 detects the phase with which the circuit breakers 3U, 3V and 3W are respectively closed, using the voltage waveform data obtained by waveform calculation processing by the waveform calculation section 13. The phase detection section 14 outputs to the closure instruction output section 15 the closure phases (timings) of each of the detected phases by the phase detection section 14.

The closure instruction output section 15 outputs instructions for respective closure of the circuit breakers 3U, 3V and 3W at the phases (timings) of each of the detected phases by the phase detection section 14.

Figure 2:
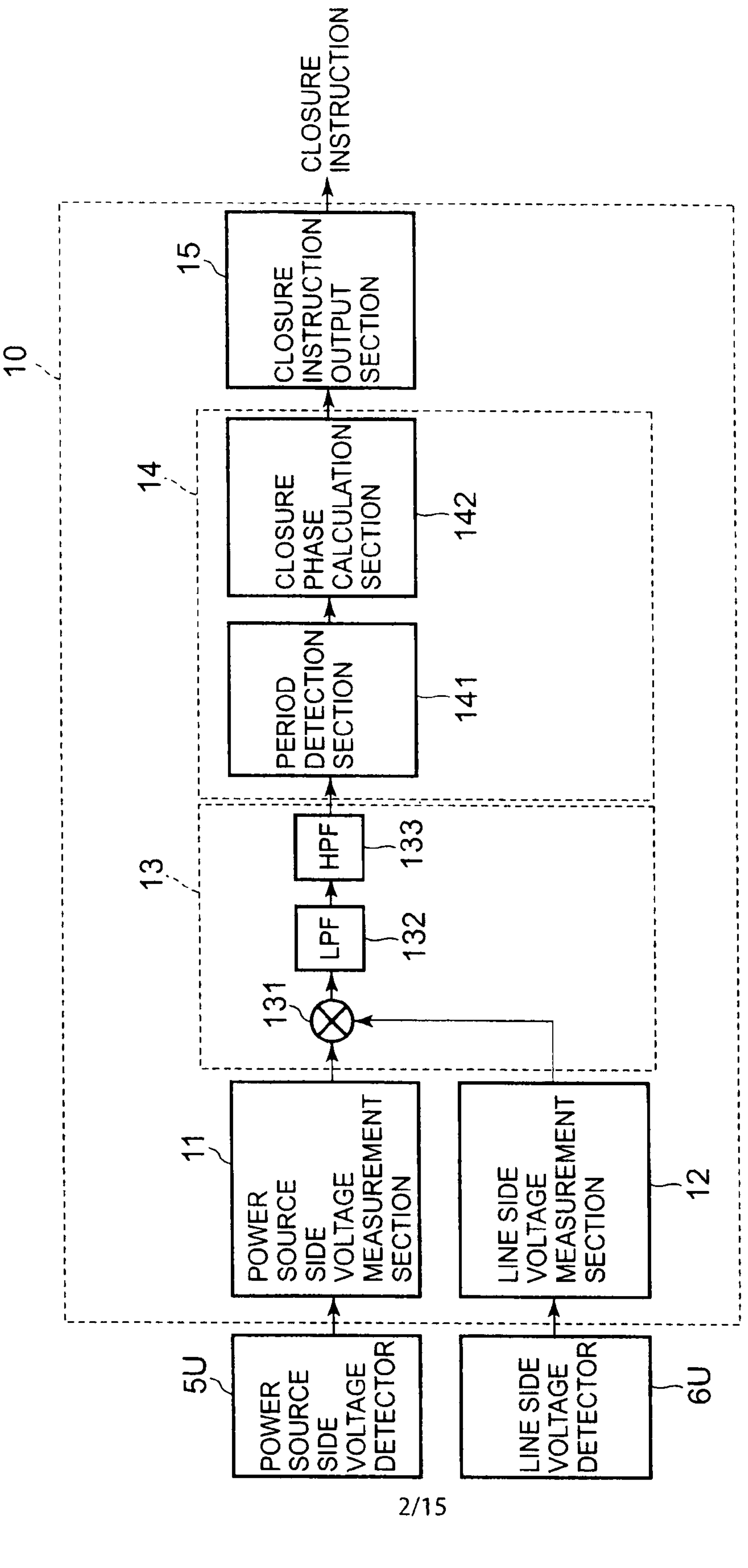
FIG. 2 is a layout diagram showing the layout of an over-voltage suppression apparatus according to the first embodiment.

FIG. 2 is a layout diagram showing the layout of an over-voltage suppression apparatus 10 according to a first embodiment of the present invention. It should be noted that FIG. 2 only shows the layout of one phase of the circuit breakers 3U, 3V and 3W; however, the other two phases are constructed in the same way.

It should be noted that, at this point, the description will chiefly focus on the construction of one phase (the U phase): as the other two phases (V phase and W phase) are constructed in the same way, description thereof will be dispensed with as appropriate. The same applies in the case of the following embodiments.

The waveform calculation section 13 comprises a multiplier 131, low-pass filter 132 and high-pass filter 133.

The multiplier 131 inputs power source side voltage waveform data of the circuit breaker 3U measured by the power source side voltage measurement section 11 and line side voltage waveform data of the circuit breaker 3U calculated by the line side voltage measurement section 12. The multiplier 131 multiplies the power source side voltage waveform data of the circuit breaker 3U and the line side voltage waveform data of the circuit breaker 3U. The multiplier 131 outputs the voltage waveform data calculated by this multiplication process to the low-pass filter 132.

The low-pass filter 132 inputs the voltage waveform data calculated by the multiplier 131. The cut-off frequency of the low-pass filter 132 is set to a frequency such that the mains frequency (commercial frequency) can be cut off. The low-pass filter 132 transmits only frequency components of the input voltage waveform data that are lower than the cut-off frequency. In this way, the low-pass filter 132 removes the mains frequency component, which is a high-frequency component, from the input voltage waveform data. The low-pass filter 132 outputs the voltage waveform data transmitted by the low-pass filter 132 to the high-pass filter 133.

The cut-off frequency of the low-pass filter 132 will now be described.

The frequency of the voltage oscillations of the transmission line 4 after the opening of the circuit breakers 3U, 3V, 3W is altered by the compensation factor of the reactor that is installed thereon, but is close to the mains frequency (commercial frequency), which is the power source side voltage frequency. Consequently, a component of lower frequency than the mains frequency appears in the voltage between contacts of the circuit breakers 3U, 3V, 3W. The cut-off frequency of the low-pass filter 133 is set to a frequency that enables the mains frequency to be cut off.

The high-pass filter 133 inputs the voltage waveform data that has passed through the low-pass filter 132. The cut-off frequency of the high-pass filter 133 is set to a frequency that enables very low frequencies close to the DC component to be cut off. The high-pass filter 133 transmits only frequency components of the input voltage waveform data that are higher than the cut-off frequency. In this way, the high-pass filter 133 removes very low frequency components from the input voltage waveform data. The high-pass filter 133 outputs the voltage waveform data transmitted by the high-pass filter 133 to the period detection section 141 of the phase detection section 14.

The phase detection section 14 comprises the period detection section 141 and a closure phase calculation section 142.

The period detection section 141 inputs the voltage waveform data that is transmitted by the high-pass filter 133. The period detection section 141 calculates the frequency at which the voltage between contacts of the circuit breaker 3U becomes a minimum, from the input voltage waveform data. The period detection section 141 outputs this calculated frequency to the closure timing calculation section 142.

The closure phase calculation section 142 inputs the period calculated by the period detection section 141. The closure phase calculation section 142 calculates the time-point (phase) that is optimum for closure of the circuit breaker 3U, from the input frequency. This optimum closure time-point is the time-point at which it is inferred that the voltage waveform of the voltage between contacts of the circuit breaker 3U will subsequently become a minimum. The closure phase calculation section 142 outputs the thus-calculated time-point to a closure instruction output section 15.

FIG. 3 to FIG. 8 are waveform diagrams showing the voltage waveforms W3 to W8, given in explanation of the calculation processing by the over-voltage suppression apparatus 10 according to the present embodiment. FIG. 3 to FIG. 8 show the respective voltage waveforms W3 to W8 from the vicinity of the time-point t0 at which the circuit breaker 3U interrupts the transmission line 4. As the coordinates shown in FIG. 3 to FIG. 8, the vertical axis shows voltage (p.u.: per unit) and the horizontal axis shows time (seconds).

Figure 3:
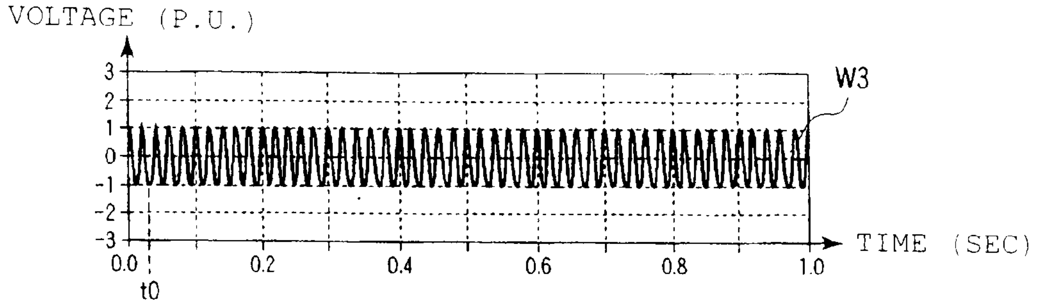
FIG. 3 is a waveform diagram showing the voltage waveform of the power source side voltage of a circuit breaker measured by a power source side voltage measurement section according to the first embodiment.
Figure 4:
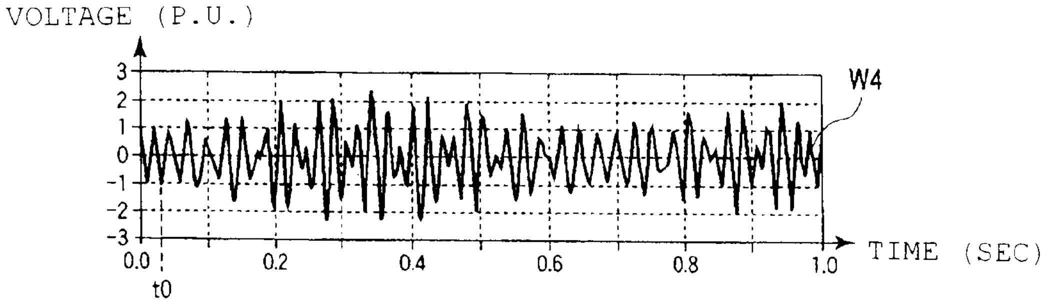
FIG. 4 is a waveform diagram showing the voltage waveform of the line side voltage of a circuit breaker measured by a line side voltage measurement section according to the first embodiment.
Figure 5:
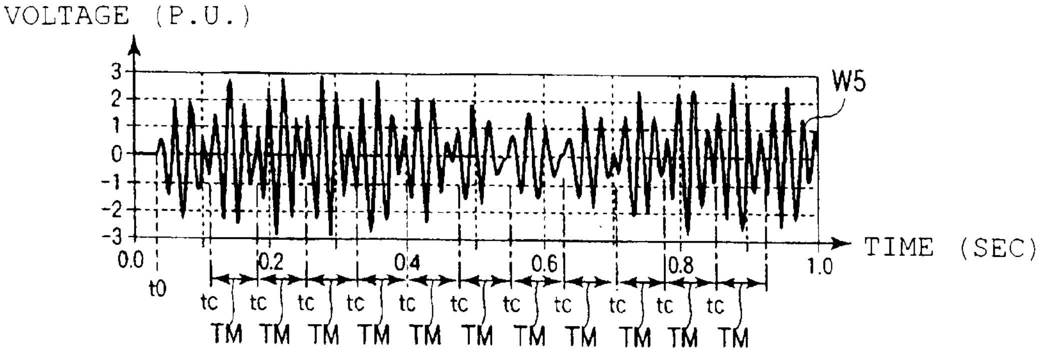
FIG. 5 is a waveform diagram showing the voltage waveform of the voltage between contacts of a circuit breaker according to the first embodiment.
Figure 6:
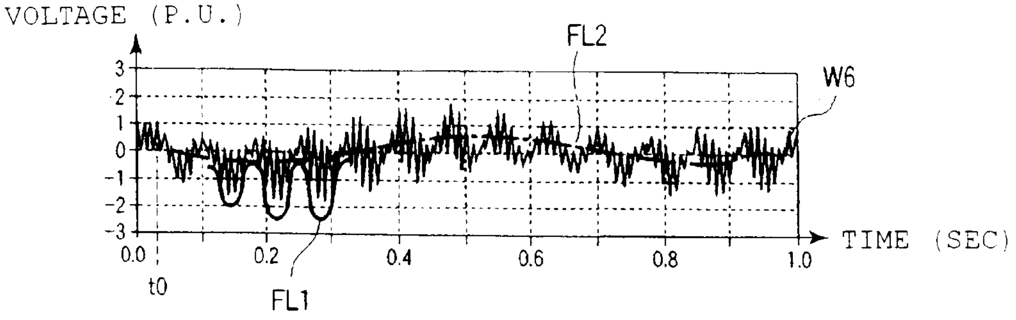
FIG. 6 is a waveform diagram of the voltage waveform obtained by calculation processing by a multiplier according to the first embodiment.
Figure 7:
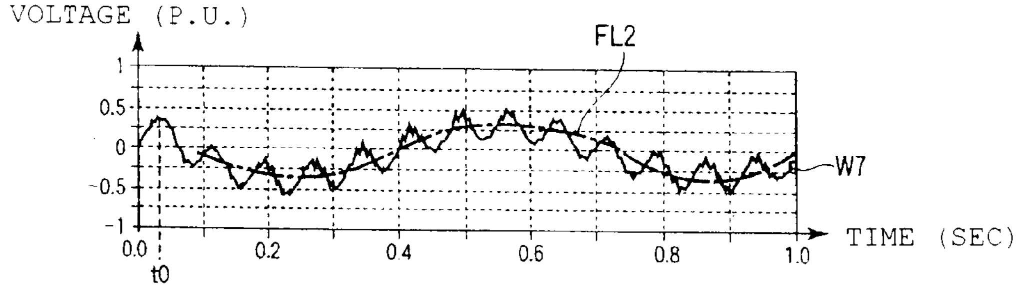
FIG. 7 is a waveform diagram showing the voltage waveform obtained by calculation processing by a low-pass filter according to the first embodiment.
Figure 8:
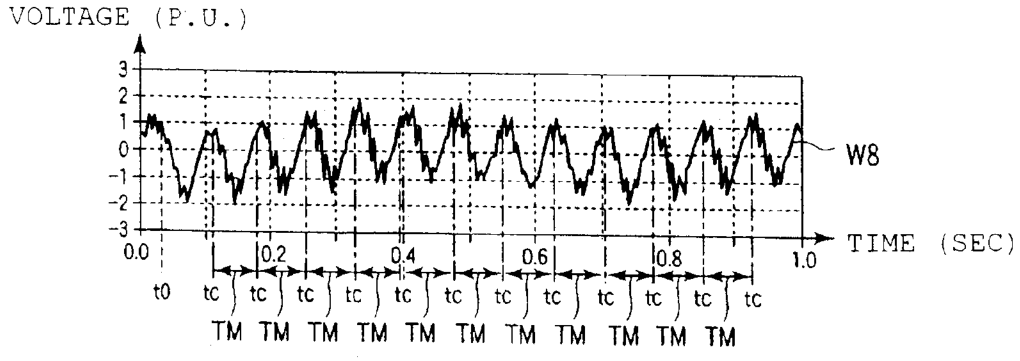
FIG. 8 is a waveform diagram showing the voltage waveform obtained by calculation processing by a high-pass filter according to the first embodiment.

FIG. 3 is a waveform diagram showing the voltage waveform W3 of the power source side voltage (voltage of the power source bus 2) of the circuit breaker 3U measured by the power source side voltage measurement section 11. FIG. 4 is a waveform diagram showing the voltage waveform W4 of the line side voltage (voltage of the transmission line 4) of the circuit breaker 3U measured by the line side voltage measurement section 12. FIG. 5 is a waveform diagram showing the voltage waveform W5 of the voltage between contacts of the circuit breaker 3U. FIG. 6 is a waveform diagram showing the voltage waveform W6 obtained by calculation processing performed by the multiplier 131. FIG. 7 is a waveform diagram showing the voltage waveform W7 obtained by calculation processing performed by the low-pass filter 132. FIG. 8 is a waveform diagram showing the voltage waveform W8 obtained by calculation processing performed by the high-pass filter 133.

The voltage represented by the voltage waveform W3 shown in FIG. 3 is applied on the power source side of the circuit breaker 3U. The voltage represented by the voltage waveform W4 shown in FIG. 4 is applied on the line side of the circuit breaker 3U.

The voltage between contacts of the circuit breaker 3U is represented by the voltage waveform W5 shown in FIG. 5. The voltage waveform W5 is found by subtraction of the line side voltage waveform W4 of the circuit breaker 3U from the power source side voltage waveform W3 of the circuit breaker 3U. Since, before the time-point t0, the voltage on the power source side of the circuit breaker 3U and the voltage on the line side of the circuit breaker 3U are the same, the voltage waveform W5 before the time-point t0 is zero.

The multiplier 131 inputs the voltage waveform data on the power source side of the circuit breaker 3U indicated by the voltage waveform W3 and the voltage waveform data on the line side of the circuit breaker 3U indicated by the voltage waveform W4. The multiplier 131 multiplies the data of these two input voltage waveforms. In this way, the multiplier 131 calculates the voltage waveform data indicated by the voltage waveform W6 shown in FIG. 6. In the voltage waveform W6, the mains frequency (commercial frequency) component, which is a high-frequency component, a low frequency component FL1, and a very low frequency component FL2 are superimposed.

The low-pass filter 132 inputs the voltage waveform data indicated by the voltage waveform W6 calculated by the multiplier 131. In this way, the low-pass filter 132 calculates the voltage waveform data indicated by the voltage waveform W7 shown in FIG. 7. The voltage waveform W7 is a waveform in which the mains frequency (commercial frequency) component of the voltage waveform W6 is suppressed and the low frequency component FL1 and the very low frequency component FL2 are extracted.

The high-pass filter 133 inputs the voltage waveform data indicated by the voltage waveform W7 calculated by the low-pass filter 132. In this way, the high-pass filter 133 calculates the voltage waveform data indicated by the voltage waveform W8 shown in FIG. 8. The voltage waveform W8 is a waveform in which the very low frequency component FL2 of the voltage waveform W7 is suppressed and the low frequency component FL1, of a frequency band that is lower than the frequency of the power source bus 2 and that is higher than the frequency of the DC component is extracted.

The period detection section 141 inputs the voltage waveform data indicated by the voltage waveform W8 whose waveform is calculated by the waveform calculation section 13. The period detection section 141 monitors the voltage waveform data indicated by the voltage waveform W8 from interruption of the transmission line 4 by the circuit breaker 3U until lapse of a preset time. The period detection section 141 detects the time-point tc at which the monitored voltage waveform W8 is a maximum of positive polarity. By this detection, the period detection section 141 measures the interval at which the time-point tc appears. The period detection section 141 calculates the period TM from this measured interval. The period detection section 141 outputs the calculated period TM to the closure phase calculation section 142.

As shown in FIG. 5 and FIG. 8, the time-point tc at which the voltage waveform W8 is a maximum of positive polarity and the time-point tc at which the voltage of the multifrequency waveform of the voltage waveform W5 is a minimum coincide. The period TM calculated by the period detection section 141 is therefore the same as the period TM at which the voltage of the multifrequency waveform of the voltage waveform W5 of the voltage between contacts is a minimum.

The closure phase calculation section 142 calculates the optimum closure phase (closure time-point) for closure of the circuit breaker 3U, from the period TM calculated by the period detection section 141. This closure phase is one of the phases at which it is inferred that the voltage waveform W8 will subsequently be a maximum of positive polarity.

The closure instruction output section 15 outputs a closure instruction to the circuit breaker 3U such that the circuit breaker 3U is closed with the closure phase calculated by the closure phase calculation section 142.

The following beneficial effects may be obtained with this embodiment.

By multiplying the voltage on the power source side of the circuit breaker 3U and the voltage on the line side of the circuit breaker 3U, the low frequency component FL1 of a frequency band that is lower than the frequency of the power source bus 2 but higher than the frequency of the DC component is caused to appear prominently. FL1 is a frequency component of the composite waveform of the voltage W5 between contacts of the circuit breaker. The low frequency component FL1 is extracted by the low-pass filter 132 and the high-pass filter 133. The time-point at which the voltage between contacts of the circuit breakers 3U, 3V, and 3W becomes small can be inferred by finding the period TM at which there is a maximum of positive polarity in the voltage waveform W8 from which the low frequency component FL1 is extracted.

By the above processes, the over-voltage suppression apparatus 10 can suppress the over-voltage generated when the circuit breakers 3U, 3V and 3W are closed, even when the voltages between contacts are of multifrequency waveform, by closing the circuit breakers 3U, 3V and 3W at the optimum closure time-point where the voltages between contacts of the circuit breakers 3U, 3V and 3W are small.

(Second Embodiment)

Figure 9:
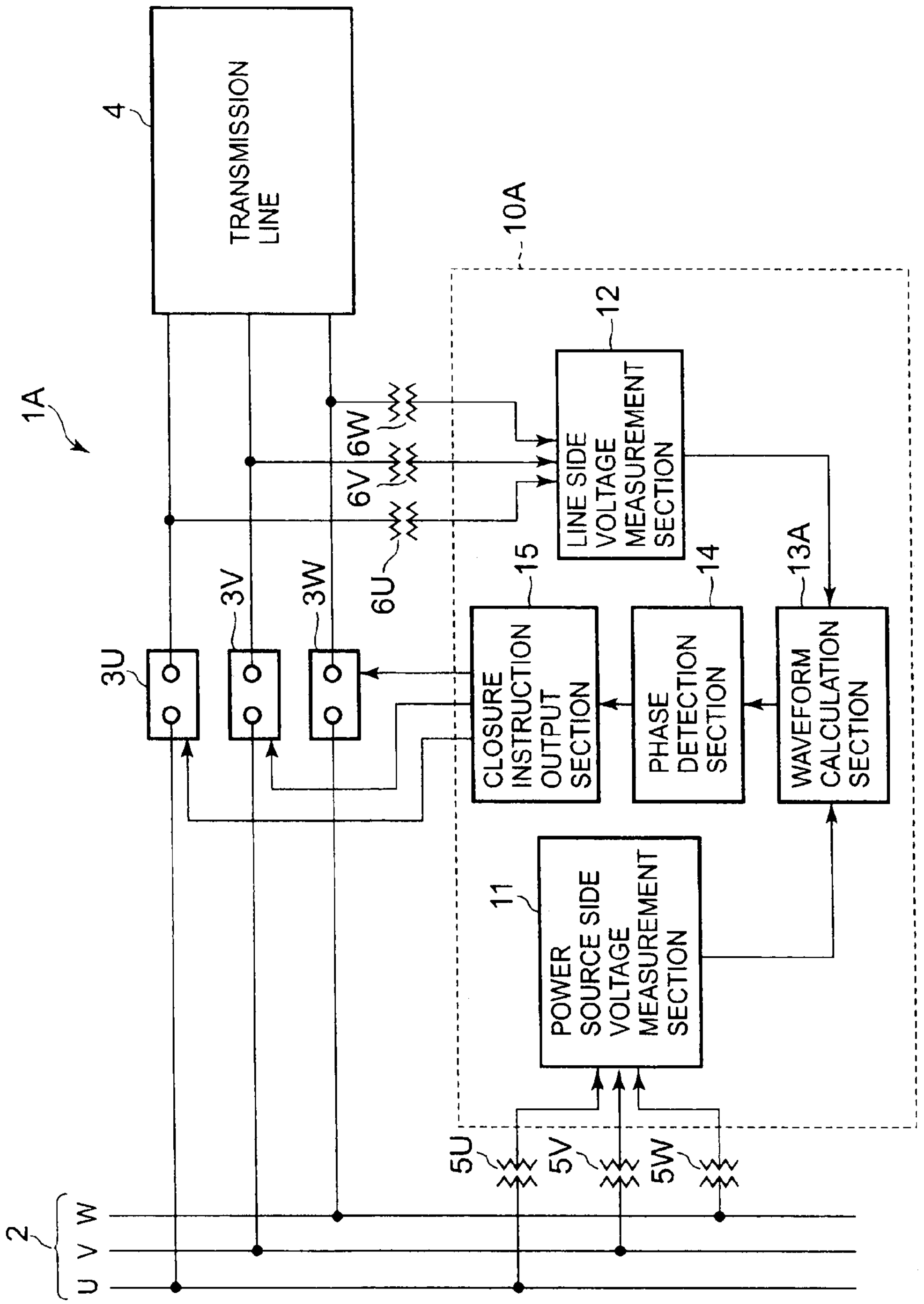
FIG. 9 is a layout diagram showing the layout of a power system to which an over-voltage suppression apparatus according to a second embodiment of the present invention has been applied.

FIG. 9 is a layout diagram showing the construction of a power system 1A to which an over-voltage suppression apparatus 10A according to a second embodiment of the present invention has been applied.

The power system 1A has a construction wherein, in the power system 1 according to the first embodiment shown in FIG. 1, the over-voltage suppression apparatus 10 is replaced by an over-voltage suppression apparatus 10A. In other respects, the power system 1A is the same as the power system 1 according to the first embodiment.

Figure 10:
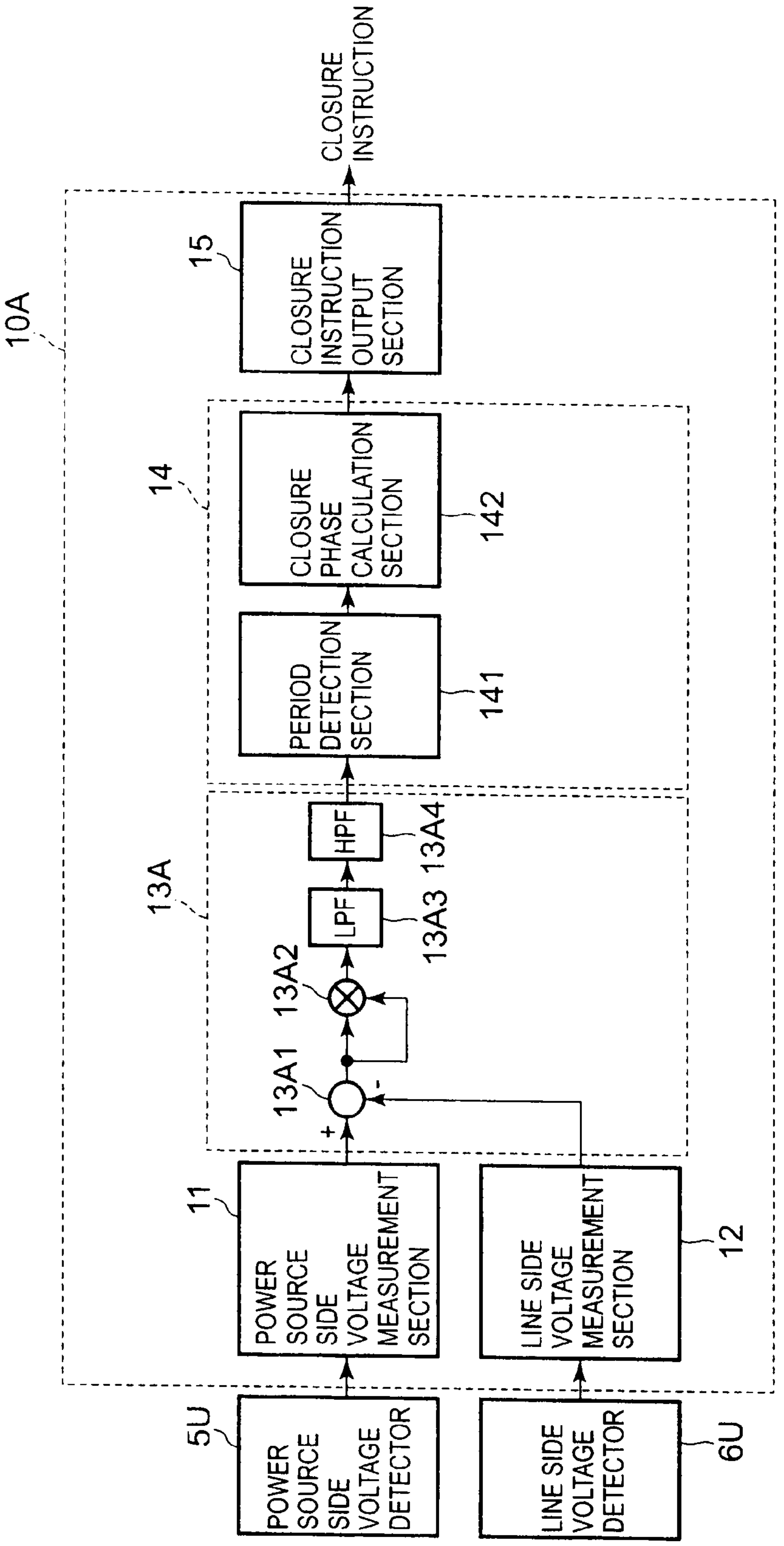
FIG. 10 is a layout diagram showing the layout of an over-voltage suppression apparatus according to the second embodiment.

FIG. 10 is a layout diagram showing the construction of an over-voltage suppression apparatus 10A according to this embodiment.

The over-voltage suppression apparatus 10A has a construction wherein, in the over-voltage suppression apparatus 10 according to the first embodiment shown in FIG. 2, a waveform calculation section 13A is provided instead of the waveform calculation section 13. In other respects, the over-voltage suppression apparatus 10A is the same as the over-voltage suppression apparatus 10 according to the first embodiment.

The waveform calculation section 13A comprises a subtractor 13A1, a multiplier 13A2, a low-pass filter 13A3 and a high-pass filter 13A4.

The subtractor 13A1 inputs the power source side voltage waveform data of the circuit breaker 3U measured by the power source side voltage measurement section 11 and the line side voltage waveform data of the circuit breaker 3U measured by the line side voltage measurement section 12. The subtractor 13A1 subtracts the line side voltage waveform data of the circuit breaker 3U from the power source side voltage waveform data of the circuit breaker 3U. By this calculation, the voltage waveform data of the voltage between contacts of the circuit breaker 3U is calculated. The subtractor 13A1 outputs the voltage waveform data of the calculated voltage between contacts to the multiplier 13A2.

The multiplier 13A2 inputs the voltage waveform data of the voltage between contacts calculated by the subtractor 13A1. The multiplier 13A2 squares the voltage waveform data that was thus input. The multiplier 13A2 outputs the voltage waveform data calculated by this squaring to the low-pass filter 13A3.

The low-pass filter 13A3 inputs the voltage waveform data that was squared by the multiplier 13A2. The cut-off frequency of the low-pass filter 13A3 is set to a frequency such that the mains frequency (commercial frequency) can be cut off. The low-pass filter 13A3 transmits only frequency components of the input voltage waveform data that are lower than the cut-off frequency. In this way, the low-pass filter 13A3 removes the mains frequency (commercial frequency) component, which is a high-frequency component, from the input voltage waveform data. The low-pass filter 13A3 outputs the voltage waveform data transmitted by the low-pass filter 13A3 to the high-pass filter 13A4.

The high-pass filter 13A4 inputs the voltage waveform data that has passed through the low-pass filter 13A3. The cut-off frequency of the high-pass filter 13A4 is set to a frequency that enables very low frequencies close to the DC component to be cut off. The high-pass filter 13A4 transmits only frequency components of the input voltage waveform data that are higher than the cut-off frequency. In this way, the high-pass filter 13A4 removes very low frequency components from the input voltage waveform data. The high-pass filter 13A4 outputs the voltage waveform data transmitted by the high-pass filter 13A4 to the period detection section 141 of the phase detection section 14.

FIG. 11 to FIG. 16 are waveform diagrams showing voltage waveforms, given in explanation of the calculation processing by the over-voltage suppression apparatus 10A according to the present embodiment. FIG. 11 to FIG. 16 show the respective voltage waveforms W11 to W16 from the vicinity of the time-point t1 at which the circuit breaker 3U interrupts the transmission line 4. As the coordinates shown in FIG. 11 to FIG. 16, the vertical axis shows voltage (p.u.) and the horizontal axis shows time (seconds).

Figure 11:
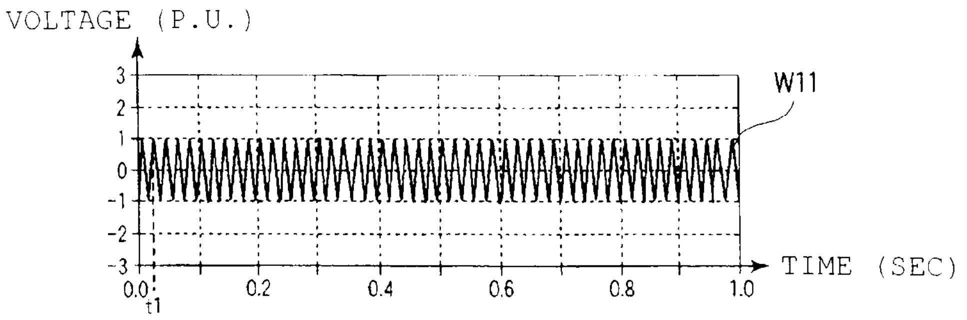
FIG. 11 is a waveform diagram showing the voltage waveform of the power source side voltage of a circuit breaker measured by a power source side voltage measurement section according to the second embodiment.
Figure 12:
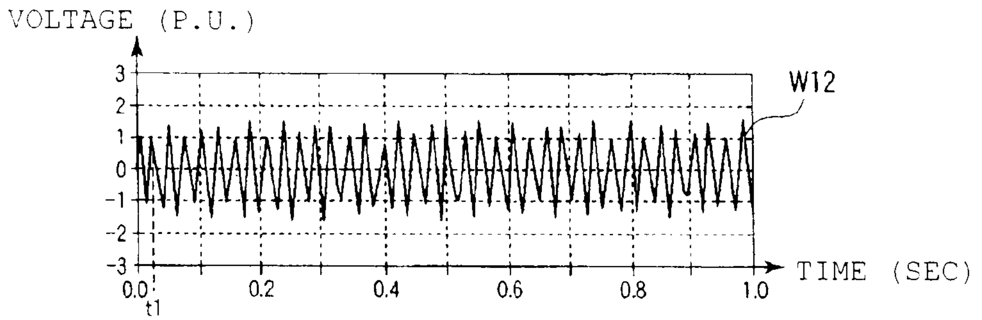
FIG. 12 is a waveform diagram showing the voltage waveform of the line side voltage of a circuit breaker measured by a line side voltage measurement section according to the second embodiment.
Figure 13:
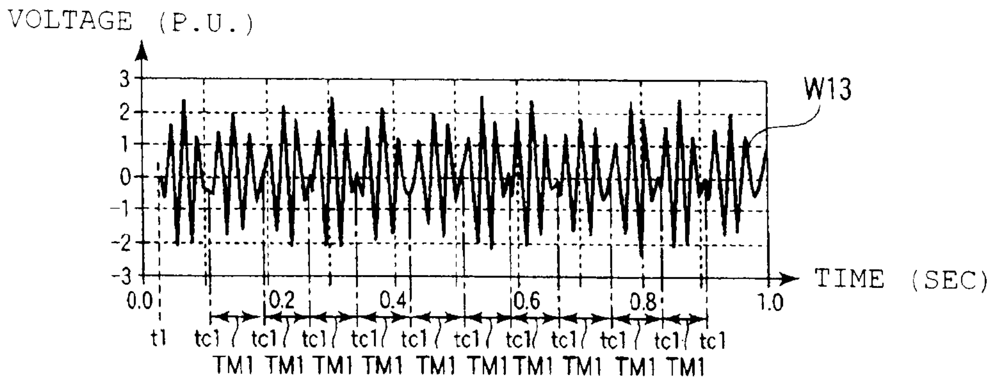
FIG. 13 is a waveform diagram of the voltage waveform of the voltage between contacts of a circuit breaker obtained by calculation processing by a subtractor according to the second embodiment.
Figure 14:
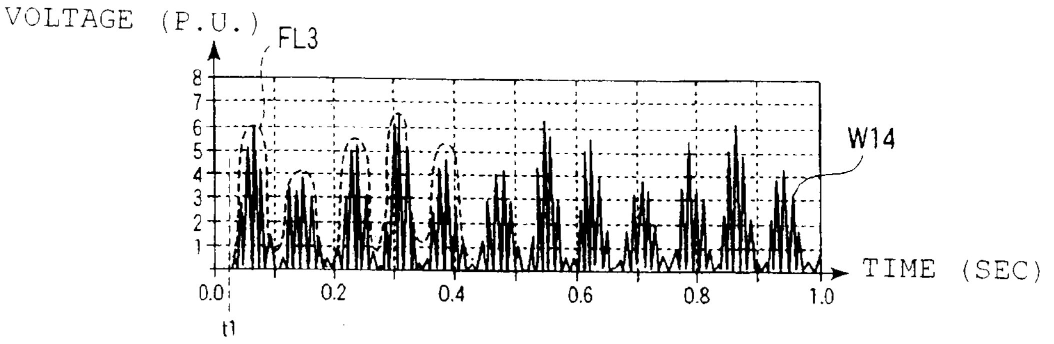
FIG. 14 is a waveform diagram showing the voltage waveform obtained by calculation processing by a multiplier according to the second embodiment.
Figure 15:
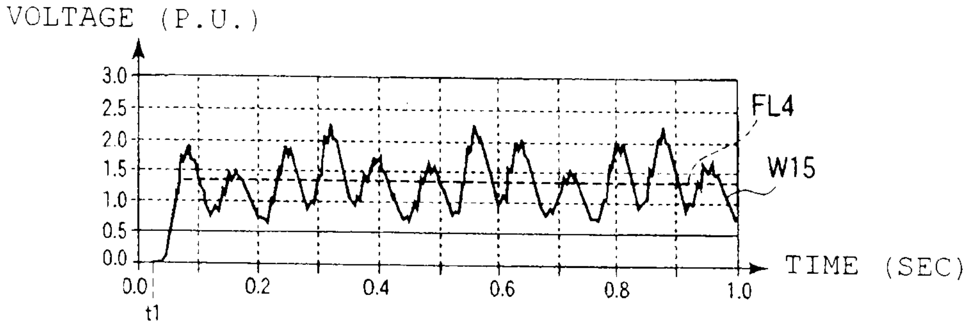
FIG. 15 is a voltage waveform showing the voltage waveform obtained by calculation processing by a low-pass filter according to the second embodiment.
Figure 16:
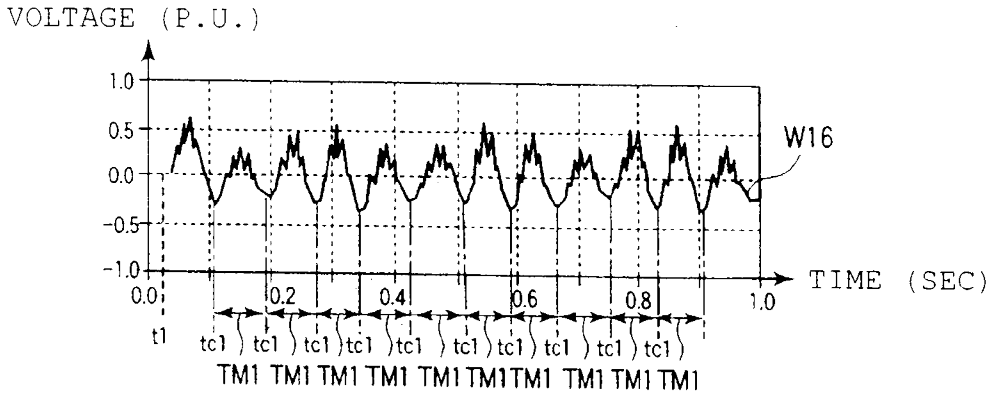
FIG. 16 is a waveform diagram showing the voltage waveform obtained by calculation processing by a high-pass filter according to the second embodiment.

FIG. 11 is a waveform diagram showing the voltage waveform W11 of the power source side voltage (voltage of the power source bus 2) of the circuit breaker 3U measured by the power source side voltage measurement section 11. FIG. 12 is a waveform diagram showing the voltage waveform W12 of the line side voltage (voltage of the transmission line 4) of the circuit breaker 3U measured by the line side voltage measurement section 12. FIG. 13 is a waveform diagram showing the voltage waveform W13 of the voltage between contacts of the circuit breaker 3U obtained by calculation processing performed by the subtractor 13A1. FIG. 14 is a waveform diagram showing the voltage waveform W14 obtained by calculation processing performed by the multiplier 131A2. FIG. 15 is a waveform diagram showing the voltage waveform W15 obtained by calculation processing performed by the low-pass filter 13A3. FIG. 16 is a waveform diagram showing the voltage waveform W16 obtained by calculation processing performed by the high-pass filter 13A4.

The voltage represented by the voltage waveform W11 shown in FIG. 11 is applied on the power source side of the circuit breaker 3U. The voltage represented by the voltage waveform W12 shown in FIG. 12 is applied on the line side of the circuit breaker 3U.

The subtractor 13A1 inputs the voltage waveform data on the power source side of the circuit breaker 3U indicated by the voltage waveform W11 and the voltage waveform data on the line side of the circuit breaker 3U indicated by the voltage waveform W12. The subtractor 13A1 subtracts the line side voltage waveform data of the circuit breaker 3U from the power source side voltage waveform data of the circuit breaker 3U. In this way, the subtractor 13A1 calculates the voltage waveform data of the voltage between contacts of the circuit breaker 3U indicated by the voltage waveform W13 shown in FIG. 13. Since, before the time-point t1, the voltage on the power source side of the circuit breaker 3U and the voltage on the line side of the circuit breaker 3U are the same, the voltage waveform W13 is zero.

The multiplier 13A2 inputs the voltage waveform data of the voltage between contacts of the circuit breaker 3U indicated by the voltage waveform W13 calculated by the subtractor 13A1. The multiplier 13A2 squares the input voltage waveform data. In this way, the multiplier 13A2 calculates the voltage waveform data indicated by the voltage waveform W14 shown in FIG. 14. In the voltage waveform W14, the mains frequency (commercial frequency) component, which is a high-frequency component, a low frequency component FL3, and a very low frequency component FL4 shown in FIG. 15 are superimposed.

The low-pass filter 13A3 inputs the voltage waveform data indicated by the voltage waveform W14 calculated by the subtractor 13A2. In this way, the low-pass filter 13A3 calculates the voltage waveform data indicated by the voltage waveform W15 shown in FIG. 15. The voltage waveform W15 is a waveform in which the mains frequency (commercial frequency) component of the voltage waveform W14 is suppressed and the low frequency component FL3 and the very low frequency component FL4 are extracted.

The high-pass filter 13A4 inputs the voltage waveform data indicated by the voltage waveform W15 calculated by the low-pass filter 13A3. In this way, the high-pass filter 13A4 calculates the voltage waveform data indicated by the voltage waveform W16 shown in FIG. 16. The voltage waveform W16 is a waveform in which the very low frequency component FL4 of the voltage waveform W15 is suppressed and the low frequency component FL3, of a frequency band that is lower than the frequency of the power source bus 2 and that is higher than the frequency of the DC component is extracted.

The period detection section 141 inputs the voltage waveform data indicated by the voltage waveform W16 whose waveform is calculated by the waveform calculation section 13A. The period detection section 141 monitors the voltage waveform data indicated by the voltage waveform W16 from interruption of the transmission line 4 by the circuit breaker 3U until lapse of a preset time. The period detection section 141 detects the time-point tc1 at which the monitored voltage waveform W16 is a maximum of negative polarity. By this detection, the period detection section 141 measures the interval at which the time-point tc1 appears. The period detection section 141 calculates the period TM1 from this measured interval. The period detection section 141 outputs the calculated period TM1 to the closure phase calculation section 142.

As shown in FIG. 13 and FIG. 16, the time-point tc1 at which the voltage waveform W16 is a maximum of negative polarity and the time-point tc1 at which the voltage of the multifrequency waveform of the voltage waveform W13 becomes small coincide. The period TM1 calculated by the period detection section 141 is therefore the same as the period TM1 at which the voltage of the multifrequency waveform of the voltage waveform W13 of the voltage between contacts becomes small.

The closure phase calculation section 142 calculates the optimum closure phase (closure time-point) for closure of the circuit breaker 3U, from the period TM1 calculated by the period detection section 141. This closure phase is one of the phases at which it is inferred that the voltage waveform W16 will subsequently be a maximum of negative polarity.

The closure instruction output section 15 outputs a closure instruction to the circuit breaker 3U such that the circuit breaker 3U is closed with the closure phase calculated by the closure timing calculation section 142.

The following beneficial effects may be obtained with this embodiment.

By squaring the voltage between contacts of the circuit breaker 3U, the low frequency component FL3, in a frequency band of lower frequency than the power source bus 2 but higher than the frequency of the DC component, is accentuated. The low-frequency component FL3 is extracted by the low-pass filter 13A3 and high-pass filter 13A4. The time-point at which the voltage between contacts becomes small can be inferred by finding the period TM1 with which the waveform becomes a maximum of negative polarity, in the voltage waveform W16 obtained by extraction of this low frequency component FL3. By these processing steps, the over-voltage suppression apparatus 10A can suppress over-voltage generated when the circuit breakers 3U, 3V, and 3W are closed, even when the voltage between contacts is a multifrequency waveform, by closing the circuit breakers 3U, 3V, and 3W at the optimum closure time-point where the voltages between contacts of the circuit breakers 3U, 3V, and 3W have become small.

Also, since the over-voltage suppression apparatus 10A directly finds the voltage between contacts and squares this voltage between contacts, it can pick out the difference between high and low voltage between contacts better than the over voltage suppression apparatus 10 according to the first embodiment. In this way, the over-voltage suppression apparatus 10A makes it possible to perform control with higher precision than does the over-voltage suppression apparatus according to the first embodiment.

However, in the case of the over-voltage suppression apparatus 10A, calculation is necessary using the subtractor A1 and multiplier 13A2, instead of calculation using the multiplier 131, as in the over-voltage suppression apparatus 10 according to the first embodiment. Consequently, the over-voltage suppression apparatus 10 according to the first embodiment has a faster calculation speed than the over-voltage suppression apparatus 10A.

(Third Embodiment)

Figure 17:
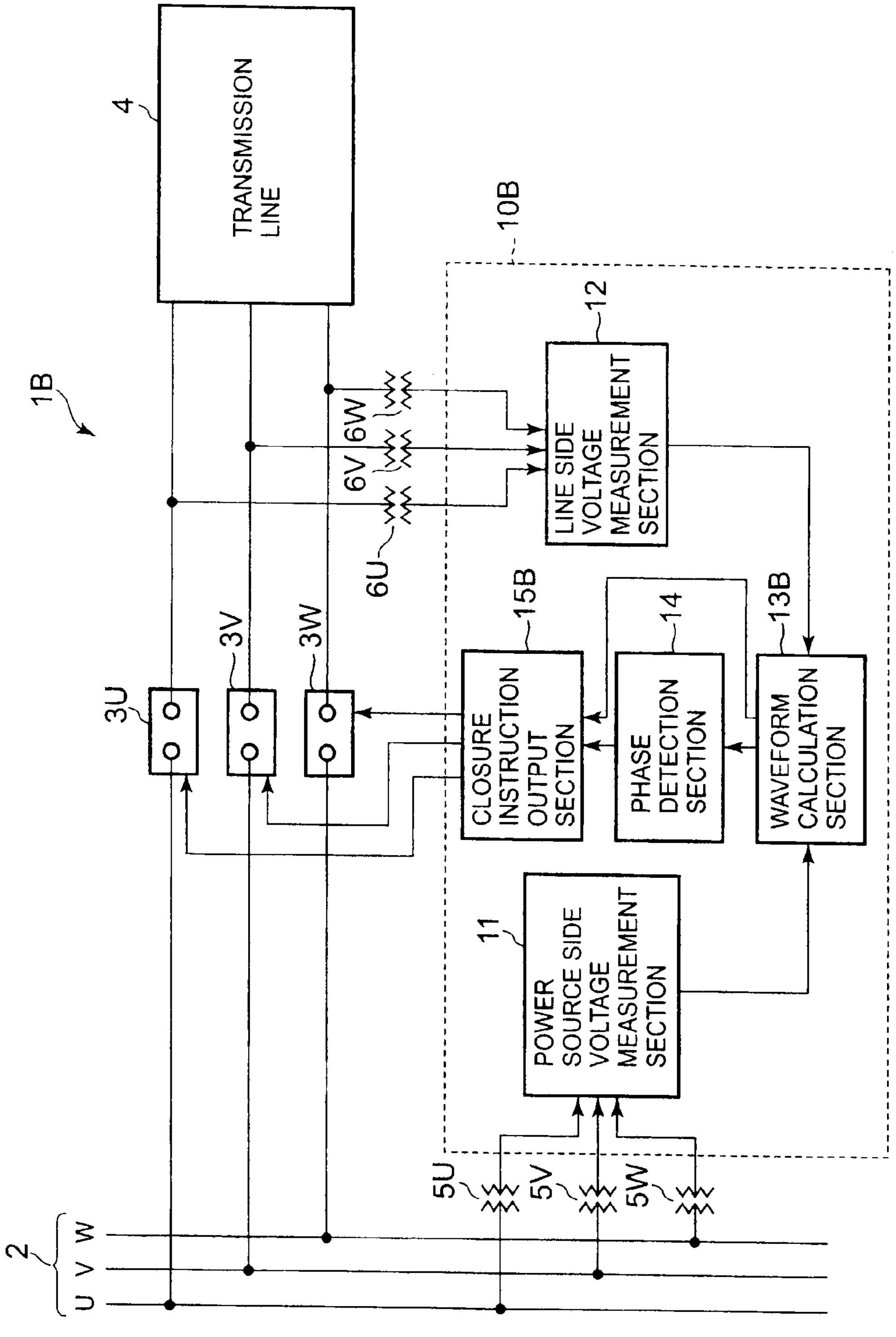
FIG. 17 is a layout diagram showing the layout of a power system to which an over-voltage suppression apparatus according to a third embodiment of the present invention has been applied.

FIG. 17 is a layout diagram showing the layout of a power system 1B to which the over-voltage suppression apparatus 10B according to a third embodiment of the present invention has been applied.

The power system 1B has a construction wherein, in the power system 1 according to the first embodiment shown in FIG. 1, an over-voltage suppression apparatus 10B is provided instead of the over-voltage suppression apparatus 10. In other respects, the power system 1B is the same as the power system 1 according to the first embodiment.

Figure 18:
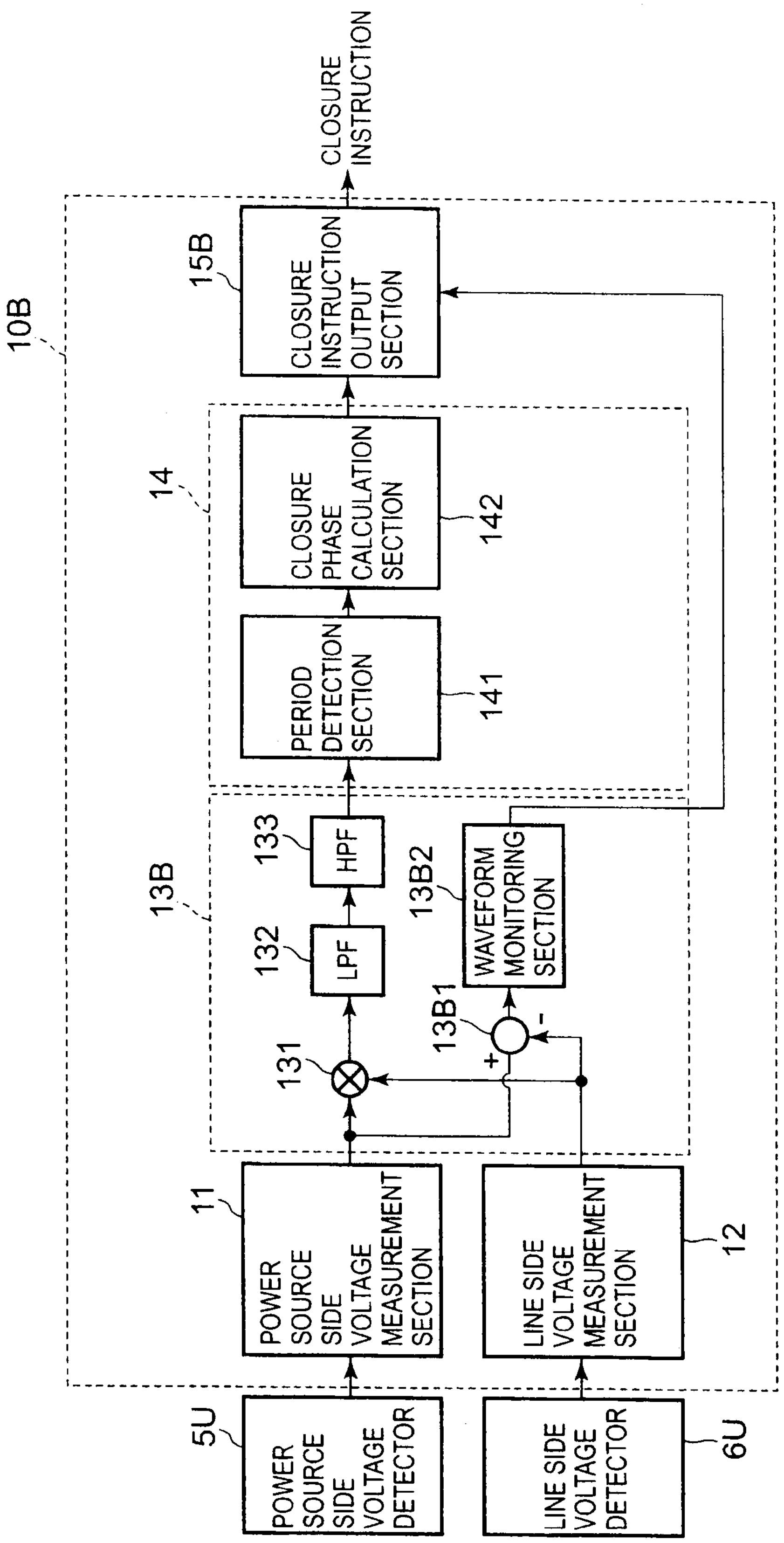
FIG. 18 is a layout diagram showing the layout of an over-voltage suppression apparatus according to a third embodiment.

FIG. 18 is a layout diagram showing the construction of an over-voltage suppression apparatus 10B according to this embodiment.

The over-voltage suppression apparatus 10B has a construction wherein, in the over-voltage suppression apparatus 10 according to the first embodiment shown in FIG. 2, a waveform calculation section 13B is provided in place of the waveform calculation section 13 and a closure instruction output section 15B is provided in place of the closure instruction output section 15. In other respects, the over-voltage suppression apparatus 10B is the same as the over-voltage suppression apparatus 10 according to the first embodiment.

The waveform calculation section 13B has a construction wherein a subtractor 13B1 and a waveform monitoring section 13B2 are added to the waveform calculation section 13 according to the first embodiment.

The subtractor 13B1 inputs the power source side voltage waveform data of the circuit breaker 3U measured by the power source side voltage measurement section 11 and the line side voltage waveform data of the circuit breaker 3U measured by the line side voltage measurement section 12. The subtractor 13B1 subtracts the line side voltage waveform data of the circuit breaker 3U from the power source side voltage waveform data of the circuit breaker 3U. By this calculation, the voltage waveform data of the voltage between contacts of the circuit breaker 3U is calculated. The subtractor 13B1 outputs this calculated voltage waveform data of the voltage between contacts to a waveform monitoring section 13B2.

The waveform monitoring section 13B2 inputs the voltage waveform data of the voltage between contacts calculated by the subtractor 13B1. By using this voltage between contacts waveform data, the waveform monitoring section 13B2 monitors whether or not the secondary arc current flowing on the line side (transmission line 4) of the circuit breaker 3U has been extinguished within a previously set period (for example 100 ms), after interruption of the transmission line 4 by the circuit breaker 3U.

The method of identifying extinction of the secondary arc current performed by the waveform monitoring section 13B2 is achieved by detecting change in the waveform of the voltage between contacts. For example, as a method of detecting change in the waveform of the voltage between contacts, such change may be identified using the frequency of the voltage between contacts. The line side voltage of the circuit breaker 3U is zero while the secondary arc current is not extinguished. Consequently, the voltage between contacts is the same as the power source side voltage (for example mains frequency (commercial frequency)) of the circuit breaker 3U. Also, if the secondary arc current is extinguished when a reactor is installed on the transmission line side, the voltage between contacts is a low voltage lower than the power source side frequency of the circuit breaker 3U. Consequently, the waveform monitoring section 13B2 can identify extinction of the secondary arc current, by detecting lowering of the frequency of the voltage between contacts.

If the secondary arc current is extinguished within the set time, the waveform monitoring section 13B2 terminates calculation processing. If the secondary arc current has not been extinguished in the set time, instead of performing waveform processing by calculation using for example the multiplier 131, the waveform monitoring section 13B2 uses the voltage waveform data of the voltage between contacts to perform calculation processing for closure of the circuit breaker 3U by suppressing the closure surge (over-voltage). The waveform monitoring section 13B2 delivers output to the closure instruction output section 15B in accordance with the calculation result.

The secondary arc current will now be described.

It is known that, in general, after a circuit breaker has interrupted the transmission line due to occurrence of a fault on the transmission line, a small current flows at the fault point due to induction from phases that were not affected by the fault or circuits that were not affected by the fault. This current is termed the secondary arc current. A secondary arc current of a few tens of milliseconds to a few hundred milliseconds that flows after the interruption of the transmission line by the circuit breaker is termed natural extinction. The fault continues whilst this secondary arc current is flowing. During this period, although an arc voltage is present due to the secondary arcing, its magnitude is small compared with the power source voltage, so, even though the circuit breaker has interrupted the transmission line, the voltage of the transmission line is practically zero. When the secondary arc current is extinguished, voltage oscillation of the transmission line commences. Accordingly, the waveform monitoring section 13B2 is able to identify extinction of the secondary arc current by detecting that the line side voltage of the circuit breaker 3U has become zero.

Next, the set time that is set by the waveform monitoring section 13B2 will be described.

The operating duty of a circuit breaker is laid down by the JEC (Japanese Electrotechnical Committee) Standard JEC-2300-1998 "AC Circuit Breakers" of the IEEJ (The Institute of Electrical Engineers of Japan). This standard lays down the duty of a circuit breaker on high-speed reclosure of a circuit, in terms of interruption-θ-closure/interruption-(1 minute)-closure/interruption. θ is standardized as 0.35 sec.

However, the time from opening of the circuit breaker 3U until extinction of the secondary arc current is governed by weather conditions, and so is not fixed. It is therefore sometimes difficult to infer the time-point where the voltage between contacts becomes small by waveform processing, in the time θ of high-speed reclosure described above, if the extinction time-point of the secondary arc current is lagging.

In the waveform monitoring section 13B2, even if the time-point at which the voltage between contacts becomes small is inferred by waveform processing, the maximum time that can be spent from the opening of the circuit breaker 3U until extinction of the secondary arc current is therefore set as the set time, in the period in which closure of the circuit breaker 3U can be performed in a time of θ. In other words, if the time until the secondary arc current is extinguished is longer than this set time, the over-voltage suppression apparatus 10B can no longer effect re-closure of the circuit breaker 3U within the necessary time θ for the above-described operating duty, if the time-point at which the voltage between contacts becomes small is inferred by waveform processing.

If the secondary arc current is extinguished in the set time, the over-voltage suppression apparatus infers the time-point at which the voltage between contacts becomes small by waveform processing. If the secondary arc current is not extinguished in the set time, the over-voltage suppression apparatus 10B performs closure of the circuit breaker 3U at the closure time-point calculated by the waveform monitoring section 13B2.

Figure 19:
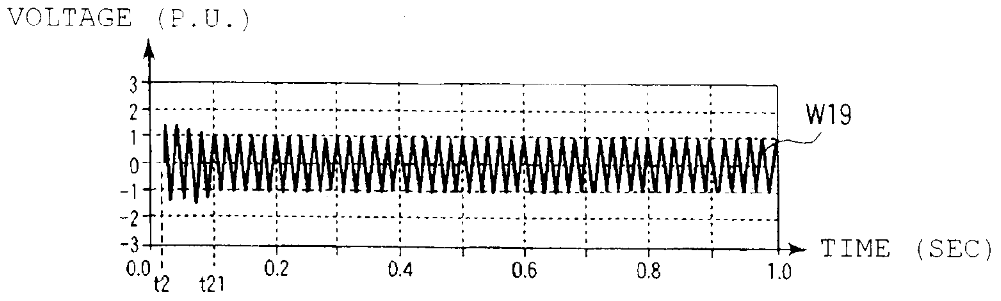
FIG. 19 is a waveform diagram showing the voltage waveform of the power source side voltage of a circuit breaker measured by a power source side voltage measurement section according to the third embodiment.
Figure 20:
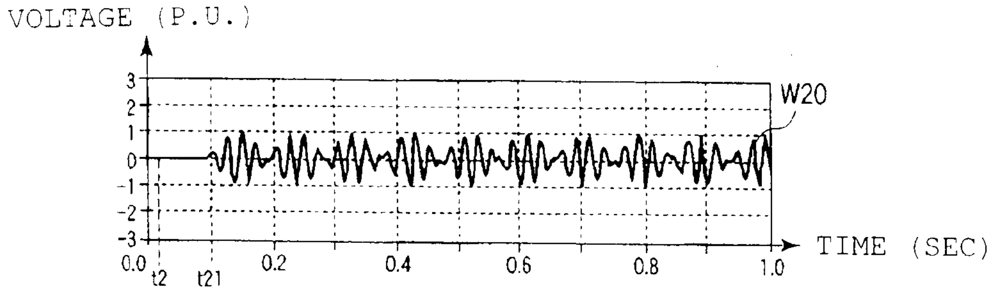
FIG. 20 is a waveform diagram showing the voltage waveform W of the line side voltage of a circuit breaker measured by a line side voltage measurement section according to the third embodiment.
Figure 21:
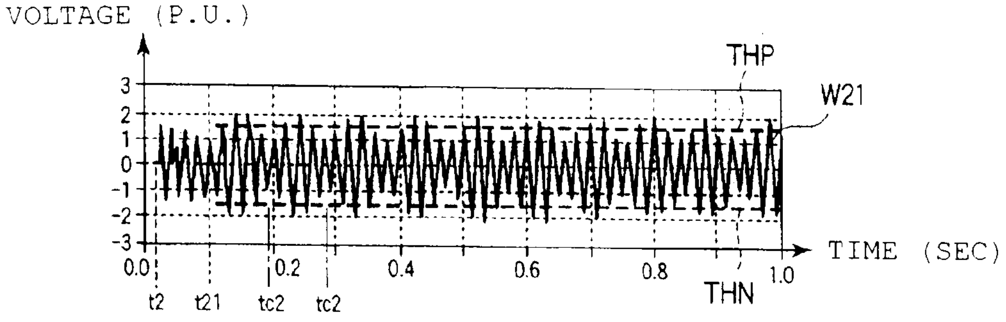
FIG. 21 is a waveform diagram showing the voltage waveform of the voltage between contacts of a circuit breaker obtained by calculation by a subtractor according to the third embodiment.

FIG. 19 to FIG. 21 are waveform diagrams illustrating the voltage waveform given in explanation of calculation processing by the over-voltage suppression apparatus 10B according to this embodiment. FIG. 19 to FIG. 21 show the condition of the respective voltage waveforms W19 to W21 from the vicinity of the time-point t2 at which the transmission line 4 was interrupted by the circuit breaker 3U. In the coordinates shown in FIG. 19 to FIG. 21, the vertical axis is the voltage (p. u.) and the horizontal axis is the time (sec).

FIG. 19 is a waveform diagram showing the voltage waveform W19 of the power source side voltage (voltage of the power source bus 2) of the circuit breaker 3U measured by the power source side voltage measurement section 11. FIG. 20 is a waveform diagram showing the voltage waveform W20 of the line side voltage (voltage of the transmission line 4) of the circuit breaker 3U measured by the line side voltage measurement section 12. FIG. 21 is a waveform diagram showing the voltage waveform W21 of the voltage between contacts of the circuit breaker 3U obtained by calculation processing by the subtractor 13B1.

On the power source side of the circuit breaker 3U, the voltage indicated by the voltage waveform W19 shown in FIG. 19 is applied. On the line side of the circuit breaker 3U, the voltage indicated by the voltage waveform W20 shown in FIG. 20 is applied.

In FIG. 19 and FIG. 20, a single-line to ground fault condition of the U phase of the transmission line will be assumed. Consequently, prior to the time-point t2 in FIG. 19 and FIG. 20, the power source side voltage W19 and line side voltage W20 are zero. Since the circuit breaker 3U performs interruption at the time-point t2, subsequently, the power source side voltage W19 appears as the power source voltage. Furthermore, the fault of the transmission line 4 continues up to the time-point t21. Specifically, the secondary arc voltage continues up to the time-point t21. The time-point t21 shows the time-point where the secondary arc current is extinguished. Consequently, the voltage waveform W20 indicating the voltage of the transmission line 4 is zero up to the time-point t21.

The subtractor 13B1 inputs the power source side voltage waveform data of the circuit breaker 3U indicated by the voltage waveform W19 and the line side voltage waveform data of the circuit breaker 3U indicated by the voltage waveform W20. The subtractor 13B1 subtracts the line side voltage waveform data of the circuit breaker 3U from the power source side voltage waveform data of the circuit breaker 3U. In this way, the subtractor 13B1 calculates the voltage waveform data of the the voltage between contacts of the circuit breaker 3U indicated by the voltage waveform W21 shown in FIG. 21. The voltage waveform W21 is zero, since the power source side voltage of the circuit breaker 3U and the line side voltage of the circuit breaker 3U are the same prior to the time-point t2.

The waveform monitoring section 13B2 inputs the voltage waveform data of the voltage between contacts of the circuit breaker 3U indicated by the voltage waveform W21 calculated by the subtractor 13B1 and the line side voltage waveform data of the circuit breaker 3U indicated by the voltage waveform W20. The waveform monitoring section 13B2 measures the time from the time-point t2 at which the circuit breaker 3U was opened to the time-point t21 at which the secondary arc current was extinguished.

The waveform monitoring section 13B2 terminates calculation processing if the time from the time-point t2 at which the circuit breaker 3U was opened to the time-point t21 at which the secondary arc current was extinguished is shorter than the set time.

If the time from the time-point t2 at which the circuit breaker 3U was opened to the time-point t21 at which the secondary arc current was extinguished is longer than the set time, the waveform monitoring section 13B2 detects the time-point at which the voltage waveform data of the voltage between contacts of the circuit breaker 3U indicated by the voltage waveform W21 has a voltage value that is lower than a preset instantaneous voltage threshold value THP or THN (in this case, taken as ±1.5 p. u.). In accordance with this detection result, the waveform monitoring section 1382 outputs a closure instruction to the closure instruction output section 15B so as to cause the circuit breaker 3U to be closed while the voltage between contacts of the circuit breaker 3U is no more than 1.5 p. u. below the peak value of the power source voltage under steady conditions.

The closure surge VS will now be described.

Figure 22:
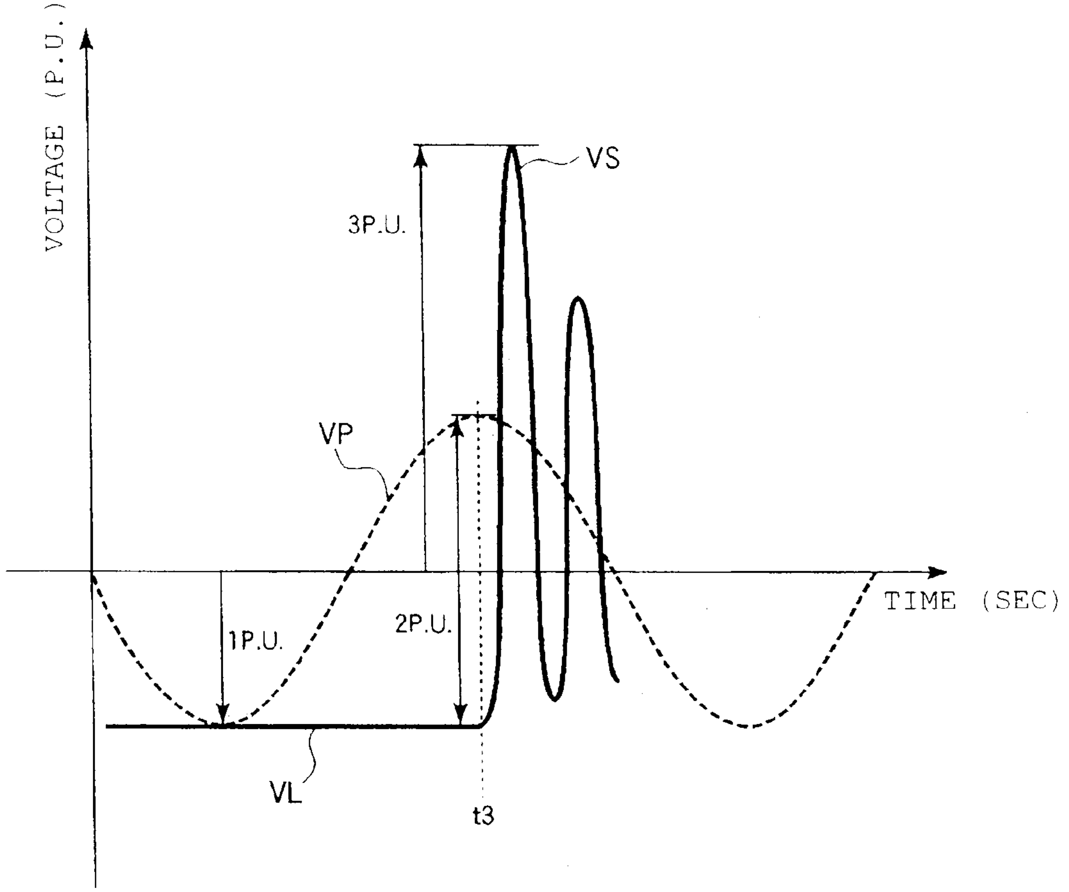
FIG. 22 is a waveform diagram showing schematically the closure surge generated when a circuit breaker according to the third embodiment closes on a no-load transmission line.

FIG. 22 is a waveform diagram showing diagrammatically the closure surge VS generated when the circuit breaker closes a no-load transmission line. FIG. 22 shows the condition in which a closure surge (over-voltage) VS of 3 p. u. with respect to ground has been generated by closure of the circuit breaker at the time-point t3.

The power source voltage VP is a sine wave of peak value 1 p. u. The DC voltage VL remaining on the transmission line prior to reclosure of the circuit breaker is 1 p. u. The voltage between contacts (difference between the instantaneous value of the power source voltage VP and the DC voltage VL) at the time-point t3 at which a closure surge VS of 3 p. u. with respect to ground was generated is 2 p. u. In other words, the closure surge VS is a voltage of about 1.5 times the voltage between contacts.

Accordingly, by closing the circuit breaker 3U at the time-point where the voltage between contacts is voltage lower than 2 p. u., the waveform monitoring section 13B2 is able to suppress the over-voltage produced by the closure surge to less than 3 p. u.

Next, the timing of closure of the circuit breaker 3U by the waveform monitoring section 13B2 will be described.

Figure 23:
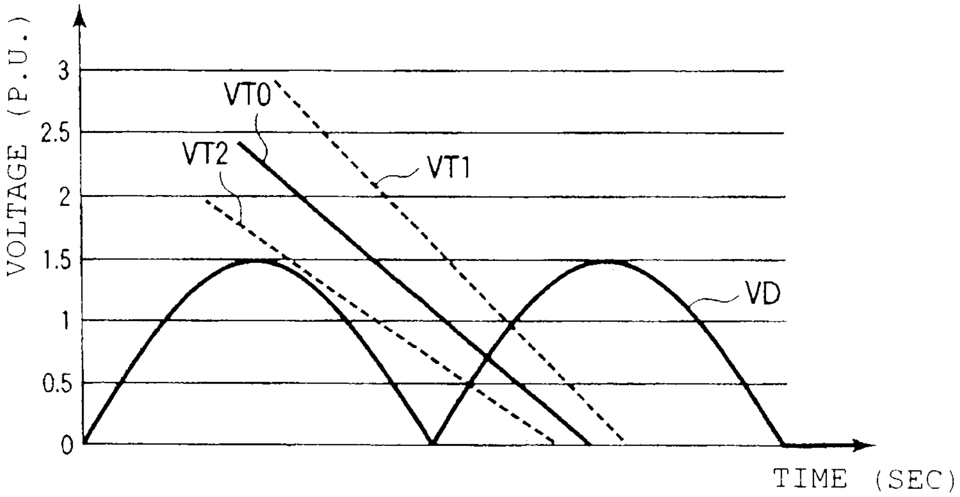
FIG. 23 is a characteristic showing the characteristic of the pre-arcing generating voltage on the closure of a circuit breaker according to the third embodiment.

FIG. 23 is a characteristic plot showing the pre-arcing generation voltage characteristics VT0, VT1 and VT2 on closure of a circuit breaker 3U according to this embodiment. In FIG. 23, the voltage VD between contacts is shown as an absolute value. The peak value of the voltage VD between contacts is taken as 1.5 p. u.

The pre-arcing generation voltage characteristic VT0 indicates the pre-arcing generation voltage characteristic that is standard for the circuit breaker 3U. In general, the circuit breaker will also have operating variability (fluctuation) and discharge variability (fluctuation). The pre-arcing generation voltage characteristics VT1, and VT2 indicate the pre-arcing generation voltage characteristics with reference to the pre-arcing generation voltage characteristic VT0, taking into consideration the operating variability and discharge variability of the circuit breaker 3U.

The point of intersection of the voltage VD between contacts and a further pre-arcing generation voltage characteristic VT1, taking into account variability, with the aim of effecting the closure of the circuit breaker 3U in such a way that the pre-arcing generation voltage characteristic of VT2, taking into account variability, does not come into contact with the voltage VD between contacts, is at about 1 p. u. Consequently, the circuit breaker 3U can be closed with voltage VD between contacts within a range of less than 1 p. u. in FIG. 23, taking into account variability (fluctuation) of the circuit breaker 3U.

The pre-arcing generation voltage characteristic, the operating variability and the discharge variability are different for different circuit breakers. Specifically, the gradients of the pre-arcing generation voltage characteristics VT0, VT1 and VT2 shown in FIG. 23 are different depending on the circuit breaker.

It may be noted that the pre-arcing generation voltage characteristic is a straight line that slopes downwardly towards the right with respect to time, irrespective of individual differences between circuit breakers. Specifically, irrespective of the circuit breaker, the voltage at which the insulation between contacts of the circuit breaker breaks down drops in proportion to the lapse of time i.e. in proportion to the drop in the distance between the contacts. Consequently, if the voltage between contacts of the circuit breaker is 1.5 p. u. at the peak value, the circuit breaker 3U can be closed when the voltage between contacts of the circuit breaker 3U is guaranteed to be no more than 1.5 p. u.

Also, even without performing waveform processing, the waveform monitoring section 13B2 can infer the phase (timing) with which the circuit breaker 3U should be closed so that the instantaneous value of the voltage between contacts is no more than 1.5 p. u., by calculation processing. Consequently, if the time taken for extinction of the secondary arc current is longer than the set time, taking into account the pre-arcing generation voltage characteristics VT0, VT1 and VT2 of the circuit breaker 3U, the waveform monitoring section 13B2 closes the circuit breaker 3U with a timing at which the voltage between contacts is no more than 1.5 p. u. In this way, the over-voltage produced by the closure surge on closure of the circuit breaker 3U can be kept smaller than the maximum of 3 p. u.

With this embodiment, the following beneficial effects can be obtained in addition to the beneficial effects of the first embodiment.

In this over-voltage suppression apparatus 10B, the time from interruption until extinction of the secondary arc current is monitored by providing a waveform monitoring section 13B2 in respect of the respective circuit breakers 3U, 3V and 3W. If the secondary arc current is not extinguished within the set time, the over-voltage suppression apparatus 10B closes the circuit breakers 3U, 3V and 3W at a time-point such as to suppress over-voltage to some extent, without performing waveform processing using for example the multiplier 131. In this case, the over-voltage suppression apparatus 10B can close the circuit breakers 3U, 3V and 3W in a shorter time than if waveform processing were to be performed, since the phase of closure of the circuit breakers 3U, 3V and 3W is calculated without performing waveform processing.

In this way, thanks to the waveform monitoring section 13B2, the over-voltage suppression apparatus 10B can achieve closure of the circuit breakers 3U, 3V and 3W by suppressing the over-voltage produced by the closure surge within a time such as to achieve the operating duty, even in cases where the time at which the secondary arc current is extinguished is lagging, making it impossible to achieve the operating duty by calculating the closure phase by waveform processing using for example a multiplier 131.

(Fourth Embodiment)

Figure 24:
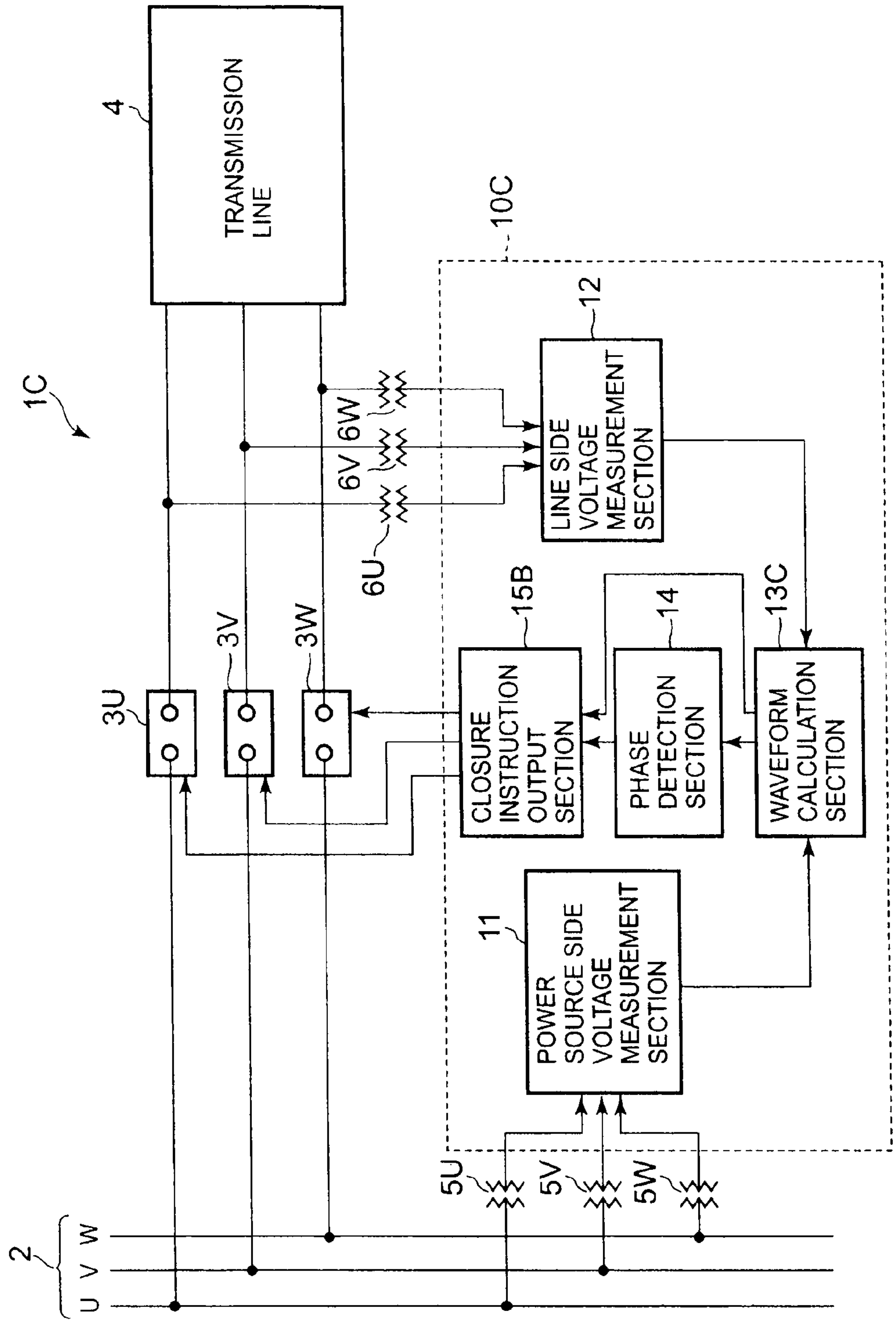
FIG. 24 is a layout diagram showing the layout of a power system to which an over-voltage suppression apparatus according to a fourth embodiment of the present invention has been applied.

FIG. 24 is a layout diagram showing the construction of a power system 1C to which an over-voltage suppression apparatus 10C according to a fourth embodiment of the present invention has been applied.

The power system 1C has a construction wherein, in the power system 1 according to the first embodiment shown in FIG. 1, an over-voltage suppression apparatus 10C is provided instead of the over-voltage suppression apparatus 10. In other respects, the power system 1C is the same as the power system 1 according to the first embodiment.

Figure 25:
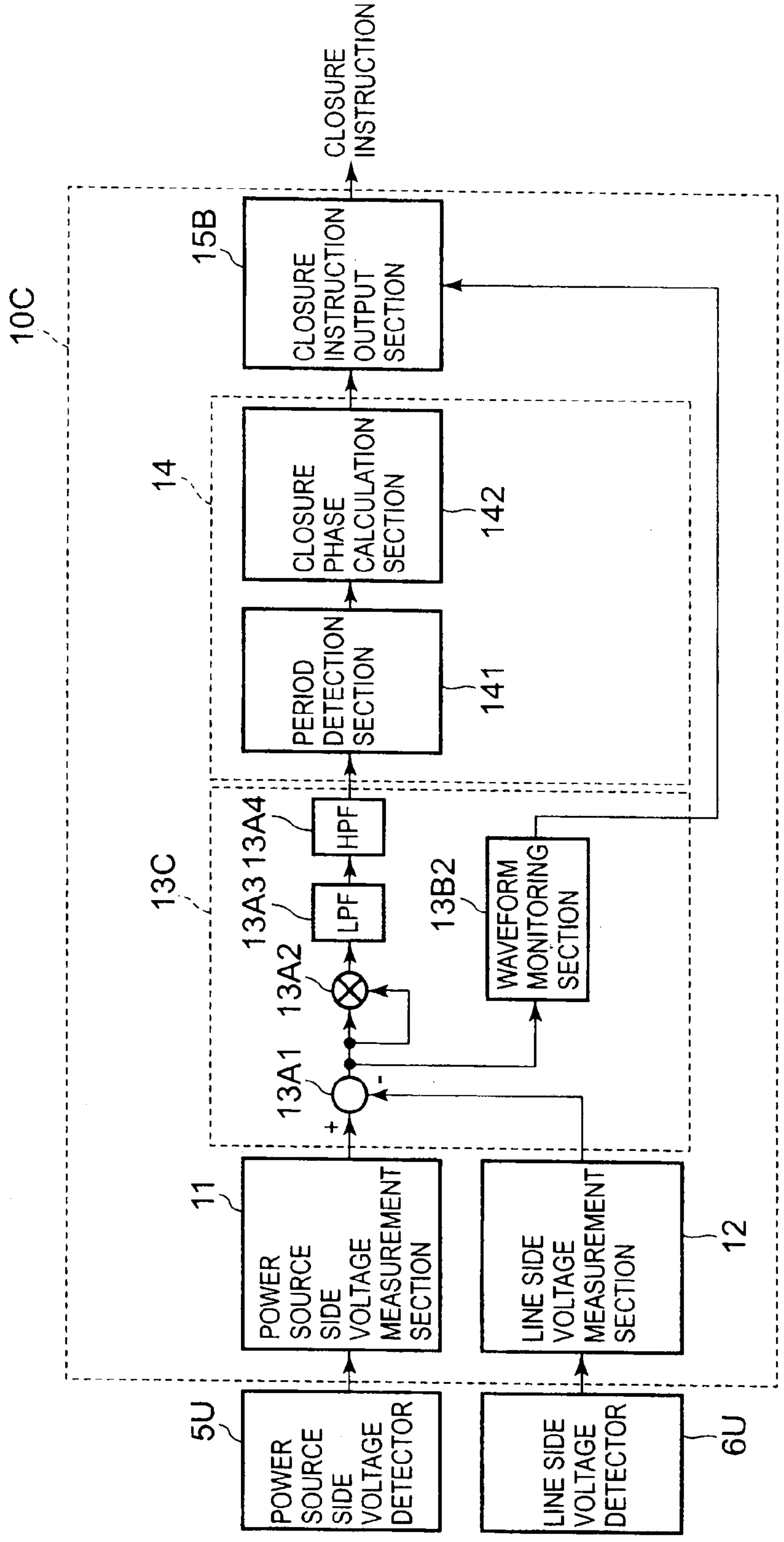
FIG. 25 is a layout diagram showing the layout of an over-voltage suppression apparatus according to the fourth embodiment of the present invention.

FIG. 25 is a layout diagram showing the construction of an over-voltage suppression apparatus 10C according to this embodiment.

The over-voltage suppression apparatus 10C has a construction wherein, in the over-voltage suppression apparatus 10B according to the third embodiment shown in FIG. 18, a waveform calculation section 13C is provided in place of the waveform calculation section 13B. In other respects, the over-voltage suppression apparatus 10C is the same as the over-voltage suppression apparatus 10B according to the third embodiment.

The waveform calculation section 13C has a construction wherein a third waveform monitoring section 13B2 shown in FIG. 18 is added to the waveform calculation section 13A according to the second embodiment shown in FIG. 10. The waveform monitoring section 13B2 inputs the voltage waveform data of the voltage between contacts calculated by the subtractor 13A1. In other respects, the waveform calculation section 13C is the same as the waveform calculation section 13A according to the second embodiment.

With this embodiment, the following beneficial effects can be obtained, in addition to the beneficial effects according to the second embodiment.

The over-voltage suppression apparatus 10C is provided with a waveform monitoring section 13B2 and monitors the time from interruption by the respective circuit breakers 3U, 3V and 3W up to extinction of the secondary arc current. If the secondary arc current is not extinguished within the set time, the over-voltage suppression apparatus 10C closes the circuit breakers 3U, 3V and 3W at a time-point such as to suppress over-voltage to some extent, without performing waveform processing using for example the multiplier 13A2. In this case, the over-voltage suppression apparatus 10C can close the circuit breakers 3U, 3V and 3W in a shorter time than if waveform processing were to be performed, since the timing of closure of the circuit breakers 3U, 3V and 3W is calculated without performing waveform processing.

In this way, thanks to the waveform monitoring section 13B2, the over-voltage suppression apparatus 10C can achieve closure of the circuit breakers 3U, 3V and 3W by suppressing the over-voltage produced by the closure surge within a time such as to achieve the operating duty, even in cases where the time at which the secondary arc current is extinguished is lagging, making it impossible to achieve the operating duty by calculating the closure timing by waveform processing using for example a multiplier 13A2.

It should be noted that, although, in the above embodiments, a construction was adopted employing a low-pass filter and a high-pass filter, it would be possible to adopt a construction wherein, instead of these filters, a bandpass filter is employed. A bandpass filter makes it possible to transmit only a specified frequency band. The bandpass filter can thus be set to pass the frequency band that would not be cut off by the respective cut-off frequencies of a low-pass filter and high-pass filter. In other words, the bandpass filter can be set to pass only a prescribed frequency band, that is lower than the mains frequency (power source frequency), but higher than low frequencies corresponding to the DC component. In this way, by adopting a construction using a bandpass filter, beneficial effects identical with those of the embodiments can be obtained.

Also, the structural elements employed in the various embodiments could be embodied by software, or by hardware, or a combination of these. For example, the various filters could be analogue filters or digital filters. Also, the various calculators such as the subtractors could be constructed by hardware (including for example calculation using a coupling of wirings that input voltages), or could be constructed by calculation of digital data using a computer.

In addition, instead of employing a high-pass filter, in the embodiments, an algorithm could be employed that calculates the maximum value or minimum value of a waveform. For example, if low-frequency components FL1, FL3 of a frequency band that is lower than the frequency of the power source bus 2, but higher than frequencies corresponding to the DC component appear fairly clearly, the maximum value or minimum value of the low-frequency components FL1, FL3 may be found by an algorithm without removing the DC component. Specifically, any arrangement may be adopted so long as the maximum value or minimum value of the low-frequency components FL1, FL3 can be found, since this is essentially the same as extracting the low-frequency components FL1, FL3. The construction can be suitably altered in for example a trade-off between performance in regard to calculation speed of the computer employed in the over-voltage suppression apparatus and the operating duty of the circuit breaker.

Also, although, in the second embodiment and fourth embodiment, a construction was adopted in which the voltage waveform data of the voltage between contacts was squared, the voltage waveform data could be raised to any even power of two or more. This is because a power of 2×n (where n is a natural number) is the same as squaring a value raised to the power n, so the effect is the same as squaring.

Furthermore, the method of ascertaining extinction of the secondary arc current flowing on the line side (transmission line 4) of the circuit breaker 3U is not restricted to that shown in the embodiments in the third embodiment and fourth embodiment. For example, ascertaining extinction of the secondary arc current could be achieved in terms of other elements (such as phase or voltage value etc) instead of in terms of the frequency of the voltage between contacts, or no such evaluation based on the voltage between contacts may be made. It would also be possible to adopt a construction in which the secondary arc current is detected by providing a DC current detector or DC voltage detector on the transmission line 4.

The present invention is not restricted to the above embodiments and could be embodied with structural elements modified in various ways in the implementation stage without departing from the gist thereof. Also, various inventions could be formed by suitable combination of a plurality of structural elements disclosed in the above embodiments. For example, some or all of the structural elements shown in the embodiments could be deleted. In addition, structural elements could be suitably combined across different embodiments.

POSSIBILITIES OF INDUSTRIAL APPLICATION

The present invention can be utilized in power systems or power distribution systems employing circuit breakers.

What is claimed is:

1. An over-voltage suppression apparatus in which over-voltage generated when a circuit breaker that opens and closes a connection of a power system having a power source and a transmission line is closed after opening of said circuit breaker is suppressed, comprising:

power source side voltage measurement means for measuring a waveform of a power source side voltage, which is a voltage with respect to ground on a power system side of said circuit breaker;

transmission line side voltage measurement means for measuring a waveform of a transmission line side voltage, which is a voltage with respect to ground on a transmission line side of said circuit breaker;

multiplication means for calculating a waveform obtained by multiplying a waveform of said power source side voltage measured by said power source side voltage measurement means and a waveform of said transmission line side voltage measured by said transmission line side voltage measurement means;

extraction means for extracting a waveform of a component of a frequency band lower than a frequency of said power source but higher than a frequency of a DC component from said waveform calculated by said multiplication means;

period detection means for detecting a period with which said waveform extracted by said extraction means is a maximum; and closure means for closing said circuit breaker in accordance with said period detected by said period detection means.

2. The over-voltage suppression apparatus according to claim 1, further comprising:

extinction identification means for ascertaining whether or not a secondary arc current flowing in said transmission line has been extinguished in a prescribed time;

voltage between contacts calculation means for calculating a waveform of said voltage between contacts of said circuit breaker, which is a difference of a waveform of said power source side voltage measured by said power source side voltage measurement means and a waveform of said transmission line side voltage measured by said transmission line side voltage measurement means;

circuit breaker closure time point inference means for inferring a time point for closure of said circuit breaker, at which an absolute value of an instantaneous value of said voltage between contacts is a voltage value lower than a threshold value, using the waveform of said voltage between contacts calculated by said voltage between contacts calculation means if said extinction identification means ascertains that said secondary arc current has not been extinguished in said prescribed time; and short-time closure means for closing said circuit breaker at said time point inferred by said circuit breaker closure time point inference means.

3. The over-voltage suppression apparatus according to claim 1, wherein said extraction means comprises:

a low-pass filter that extracts a low frequency component; and a high-pass filter that extracts a high-frequency component.

4. The over-voltage suppression apparatus according to claim 1, wherein said extraction means is a bandpass filter that extracts a prescribed frequency band.

5. An over-voltage suppression apparatus in which over-voltage generated when a circuit breaker that opens and closes a connection of a power system having a power source and a transmission line is closed after opening of said circuit breaker is suppressed, comprising:

power source side voltage measurement means for measuring a waveform of a power source side voltage, which is a voltage with respect to ground on said power system side of said circuit breaker;

transmission line side voltage measurement means for measuring a waveform of a transmission line side voltage, which is a voltage with respect to ground on said transmission line side of said circuit breaker;

voltage between contacts calculation means for calculating a waveform of an voltage between contacts of said circuit breaker, which is a difference of a waveform of said power source side voltage measured by said power source side voltage measurement means and a waveform of said transmission line side voltage measured by said transmission line side voltage measurement means;

square calculation means for calculating a waveform obtained by squaring said waveform of said voltage between contacts calculated by said voltage between contacts calculation means;

extraction means for extracting a waveform of a component of a frequency band lower than a frequency of said power source but higher than a frequency of a DC component from said waveform calculated by said square calculation means;

period detection means for detecting a period with which said waveform extracted by said extraction means is a minimum; and closure means for closing said circuit breaker in accordance with said period detected by said period detection means.

6. The over-voltage suppression apparatus according to claim 5, comprising:

extinction identification means for ascertaining whether or not a secondary arc current flowing in said transmission line has been extinguished in a prescribed time;

circuit breaker closure time point inference means for, if said extinction identification means ascertains that said secondary arc current has not been extinguished in said prescribed time, inferring a time point for closure of said circuit breaker, at which an absolute value of an instantaneous value of said voltage between contacts is a voltage value lower than a threshold value, using said waveform of said voltage between contacts calculated by said voltage between contacts calculation means; and short-time closure means for closing said circuit breaker at said time point inferred by said circuit breaker closure time point inference means.

7. The over-voltage suppression apparatus according to claim 5, wherein said extraction means comprises:

a low-pass filter that extracts a low frequency component; and a high-pass filter that extracts a high-frequency component.

8. The over-voltage suppression apparatus according to claim 5, wherein said extraction means is a bandpass filter that extracts a prescribed frequency band.

9. An over-voltage suppression method in which over-voltage generated when a circuit breaker that opens and closes a connection of a power system having a power source and a transmission line is closed after opening of said circuit breaker is suppressed, comprising:

a step of measuring a waveform of a power source side voltage, which is a power source system side voltage with respect to ground of said circuit breaker;

a step of measuring a waveform of a transmission line side voltage, which is said transmission line side voltage with respect to ground of said circuit breaker;

a step of calculating a waveform obtained by multiplying said waveform of said power source side voltage and said waveform of said transmission line side voltage;

a step of extracting a waveform of a component of a frequency band lower than a frequency of said power source but higher than a frequency of a DC component from said waveform calculated by said multiplication;

a step of detecting a period with which said extracted waveform is a maximum; and a step of closing said circuit breaker in accordance with said period.

10. An over-voltage suppression method according to claim 9, comprising:

a step of ascertaining whether or not said secondary arc current flowing in said transmission line has been extinguished in a prescribed time;

a step of calculating a waveform of a voltage between contacts of said circuit breaker, which is a difference of said waveform of said power source side voltage and said waveform of said transmission line side voltage;

a step of, if it is ascertained that said secondary arc current has not been extinguished in said prescribed time, inferring a time point for closure of said circuit breaker, at which an absolute value of an instantaneous value of said voltage between contacts is a voltage value lower than a threshold value, using said waveform of said voltage between contacts; and a step of closing said circuit breaker at said time point.

11. The over-voltage suppression method according to claim 9, wherein said extracting step performs extraction using a low-pass filter that extracts a low frequency component and a high-pass filter that extracts a high-frequency component.

12. The over-voltage suppression method according to claim 9, wherein said extracting step performs extraction using a bandpass filter that extracts a prescribed frequency band.

13. An over-voltage suppression method in which over-voltage generated when a circuit breaker that opens and closes a connection of a power system having a power source and a transmission line is closed after opening of said circuit breaker is suppressed, comprising:

a step of measuring a waveform of a power source side voltage, which is a power source system side voltage with respect to ground of said circuit breaker;

a step of measuring a waveform of a transmission line side voltage, which is said transmission line side voltage with respect to ground of said circuit breaker;

a step of calculating a waveform of said voltage between contacts of said circuit breaker, which is a difference of said waveform of said power source side voltage and said waveform of said transmission line side voltage;

a step of calculating a waveform obtained by squaring said waveform of said voltage between contacts;

a step of extracting a waveform of a component of a frequency band lower than a frequency of said power source but higher than a frequency of the DC component from said squared waveform;

a step of detecting a period with which said extracted waveform is a minimum; and a step of closing said circuit breaker in accordance with said period.

14. The over-voltage suppression method according to claim 13, comprising:

a step of ascertaining whether or not said secondary arc current flowing in said transmission line has been extinguished in a prescribed time;

a step of, if it is ascertained that said secondary arc current has not been extinguished in said prescribed time, inferring a time point for closure of said circuit breaker, at which an absolute value of an instantaneous value of said voltage between contacts is a voltage value lower than a threshold value, using the waveform of said voltage between contacts; and a step of closing said circuit breaker at said time point.

15. The over-voltage suppression method according to claim 13, wherein said extracting step performs extraction using a low-pass filter that extracts a low frequency component and a high-pass filter that extracts a high-frequency component.

16. The over-voltage suppression method according to claim 13, wherein said extracting step performs extraction using a low-pass filter that extracts a low frequency component and a high-pass filter that extracts a high-frequency component.

* * * * *